United States Patent
Montalban

(10) Patent No.: US 10,747,020 B2
(45) Date of Patent: Aug. 18, 2020

(54) HINGE FOR EYEGLASSES

(71) Applicant: VISOTTICA INDUSTRIE S.p.A., Susegana (IT)

(72) Inventor: Rinaldo Montalban, Venice (IT)

(73) Assignee: VISCOTTA INDUSTRIES S.p.A., Susegana (IT)

( * ) Notice: Subject to any disclaimer, the term of this patent is extended or adjusted under 35 U.S.C. 154(b) by 112 days.

(21) Appl. No.: 16/211,291

(22) Filed: Dec. 6, 2018

(65) Prior Publication Data

US 2019/0171041 A1    Jun. 6, 2019

(30) Foreign Application Priority Data

Dec. 6, 2017   (IT) .................. 102017000141240
Dec. 6, 2017   (IT) .................. 202017000141274

(51) Int. Cl.
| | |
|---|---|
| *G02C 5/22* | (2006.01) |
| *G02C 11/00* | (2006.01) |
| *G06K 19/07* | (2006.01) |
| *G06K 19/00* | (2006.01) |
| *G06K 13/08* | (2006.01) |
| *E05B 73/00* | (2006.01) |
| *A45C 13/42* | (2006.01) |

(52) U.S. Cl.
CPC .......... *G02C 5/22* (2013.01); *E05B 73/0035* (2013.01); *G02C 11/10* (2013.01); *G06K 13/085* (2013.01); *G06K 19/005* (2013.01); *G06K 19/0723* (2013.01); *A45C 13/42* (2013.01)

(58) Field of Classification Search
CPC .......... G02C 5/22–5/229; E05B 73/00–73/02
USPC .................. 351/111–123, 153, 158
See application file for complete search history.

(56) References Cited

U.S. PATENT DOCUMENTS

| | | | | |
|---|---|---|---|---|
| 2,983,797 | A * | 5/1961 | Lybarger | G02C 11/06 381/321 |
| 3,045,543 | A * | 7/1962 | O'Dea | G02C 1/04 351/91 |
| 5,144,820 | A * | 9/1992 | Holmgren | E05B 73/0035 351/111 |
| 5,606,743 | A * | 2/1997 | Vogt | H04B 1/086 16/228 |
| 6,076,927 | A * | 6/2000 | Owens | G02C 5/10 351/118 |
| 6,276,033 | B1 * | 8/2001 | Johnson | E05B 73/0035 24/3.1 |
| 6,276,608 | B1 | 8/2001 | Cockayne et al. | |

(Continued)

FOREIGN PATENT DOCUMENTS

| | | | | |
|---|---|---|---|---|
| EP | 1149972 | A2 * | 10/2001 | G02C 11/00 |
| EP | 1152111 | A1 * | 11/2001 | E05B 73/0035 |
| WO | 2017108981 | | 6/2017 | |

*Primary Examiner* — Zachary W Wilkes
(74) *Attorney, Agent, or Firm* — Mark M. Friedman

(57) ABSTRACT

Hinge for eyeglasses which is provided with a housing seat in which a TAG is inserted. The TAG is provided with an electronic identification device and with a support body containing the electronic device at its interior. The support body is provided with a seat, which removably houses the electronic device, and is provided with an opening for the insertion of the electronic device at its interior. The seat has at least one elastically pliable portion, which intercepts the electronic device in order to retain it within the seat itself.

20 Claims, 15 Drawing Sheets

(56) References Cited

U.S. PATENT DOCUMENTS

| | | | | |
|---|---|---|---|---|
| 6,582,075 B1* | 6/2003 | Swab | ................ | G02C 5/146 |
| | | | | 351/121 |
| 6,722,766 B1* | 4/2004 | Myette | ................ | G02C 11/08 |
| | | | | 351/158 |
| 7,651,217 B2* | 1/2010 | Welchel | ................ | G02C 3/003 |
| | | | | 351/110 |
| 7,726,806 B2* | 6/2010 | Boulas | ................ | G02C 11/02 |
| | | | | 351/51 |
| 7,784,935 B2* | 8/2010 | Jackson | ................ | G02C 11/10 |
| | | | | 351/121 |
| 7,997,724 B1* | 8/2011 | Hsu | ................ | G02C 11/04 |
| | | | | 351/121 |
| 8,007,101 B1* | 8/2011 | Wang | ................ | G02C 11/04 |
| | | | | 351/158 |
| 8,337,014 B2* | 12/2012 | Kokonaski | ................ | G02C 7/08 |
| | | | | 351/158 |
| 8,491,118 B2* | 7/2013 | Waters | ................ | G02C 11/04 |
| | | | | 351/158 |
| 8,733,138 B2* | 5/2014 | Favier | ................ | E05B 73/0017 |
| | | | | 70/19 |
| 8,994,612 B2* | 3/2015 | Fujishiro | ............ | G02B 27/0172 |
| | | | | 345/8 |
| D741,399 S * | 10/2015 | Ho | ................ | D16/335 |
| 9,244,292 B2* | 1/2016 | Swab | ................ | H04W 52/248 |
| 9,488,520 B2* | 11/2016 | Howell | ................ | G01J 1/0271 |
| 9,766,479 B2* | 9/2017 | Healy | ................ | G02C 1/06 |
| 9,803,401 B2* | 10/2017 | Luo | ................ | E05B 73/0017 |
| 9,841,603 B2* | 12/2017 | Halpin | ................ | G02B 27/0176 |
| 10,353,221 B1* | 7/2019 | Graff | ................ | G02C 11/06 |
| 10,379,376 B2* | 8/2019 | Kuczewski | ................ | G02C 5/22 |
| 2005/0081302 A1 | 4/2005 | Elsener | | |
| 2007/0251062 A1* | 11/2007 | Saitoh | ................ | F21V 21/088 |
| | | | | 24/303 |
| 2009/0134223 A1 | 5/2009 | Matthews et al. | | |
| 2010/0302502 A1* | 12/2010 | Ahn | ................ | G02C 11/04 |
| | | | | 351/158 |
| 2013/0169924 A1* | 7/2013 | Lampley, Jr. | ........ | G02C 11/00 |
| | | | | 351/158 |
| 2013/0222758 A1* | 8/2013 | He | ................ | G02C 11/04 |
| | | | | 351/158 |
| 2014/0015675 A1* | 1/2014 | Raz | ................ | G08B 13/2434 |
| | | | | 340/572.1 |
| 2014/0332597 A1 | 11/2014 | Gelinotte et al. | | |
| 2019/0004338 A1* | 1/2019 | Borsoi | ................ | G02C 11/10 |
| 2019/0198983 A1* | 6/2019 | Moore | ................ | G02C 5/22 |
| 2019/0212566 A1* | 7/2019 | Lee | ................ | G02C 5/22 |

\* cited by examiner

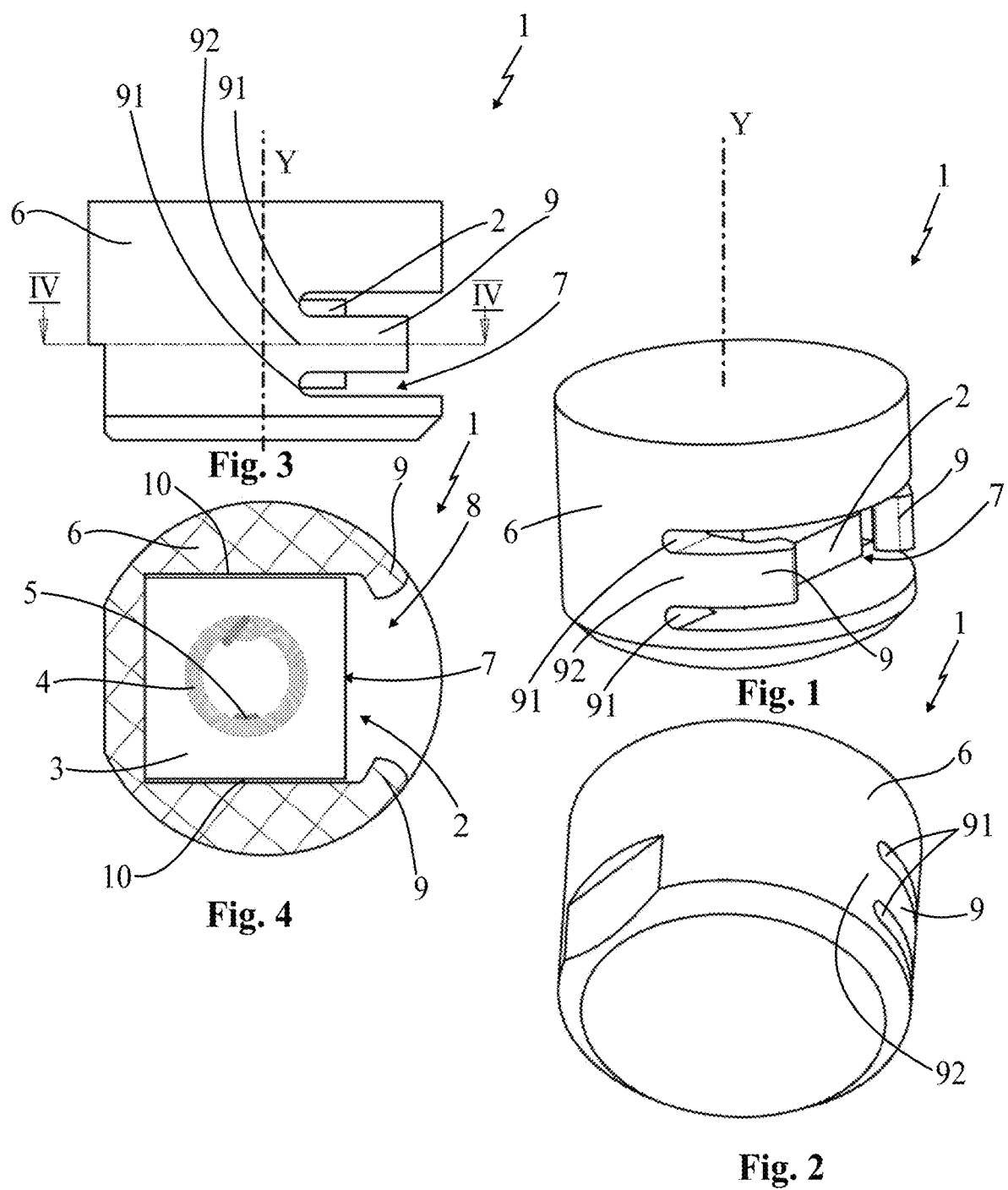

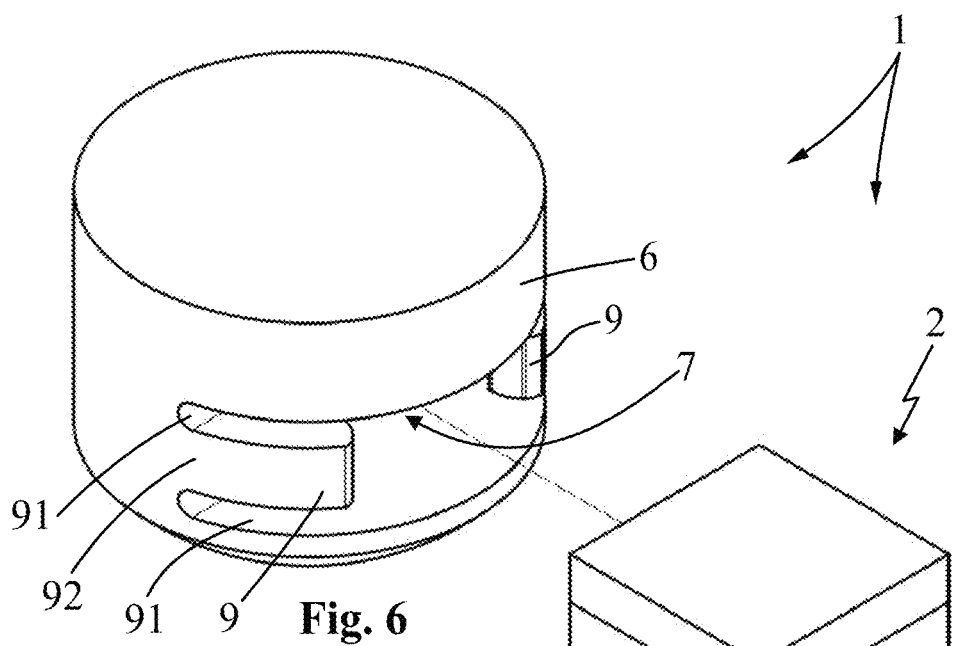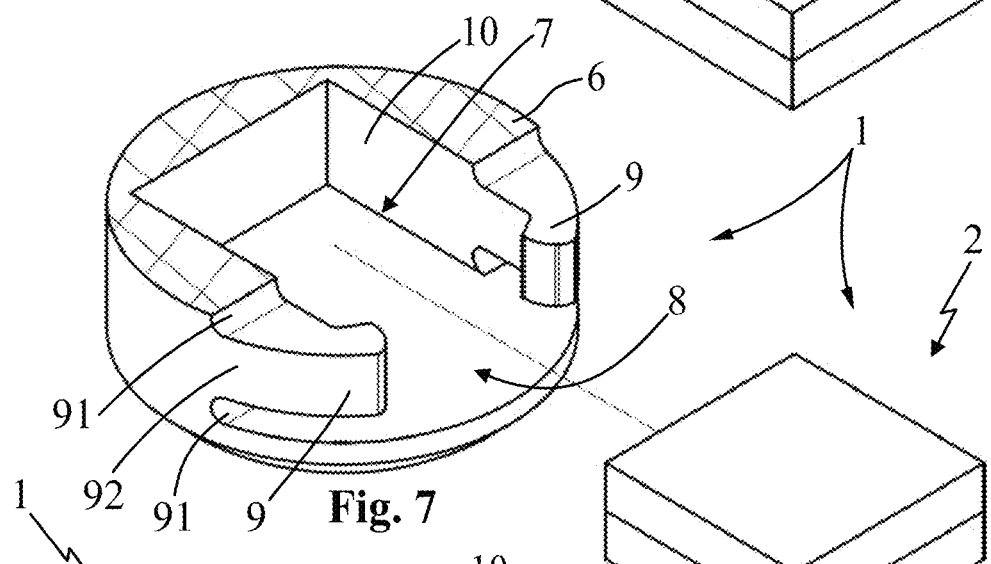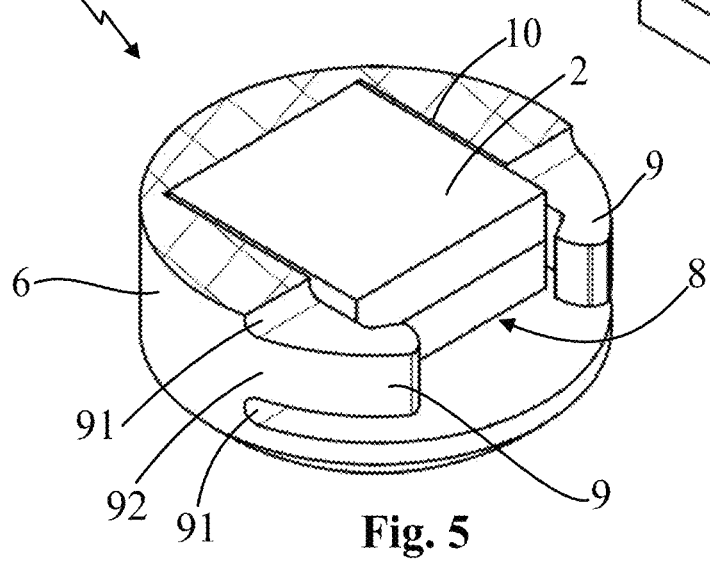

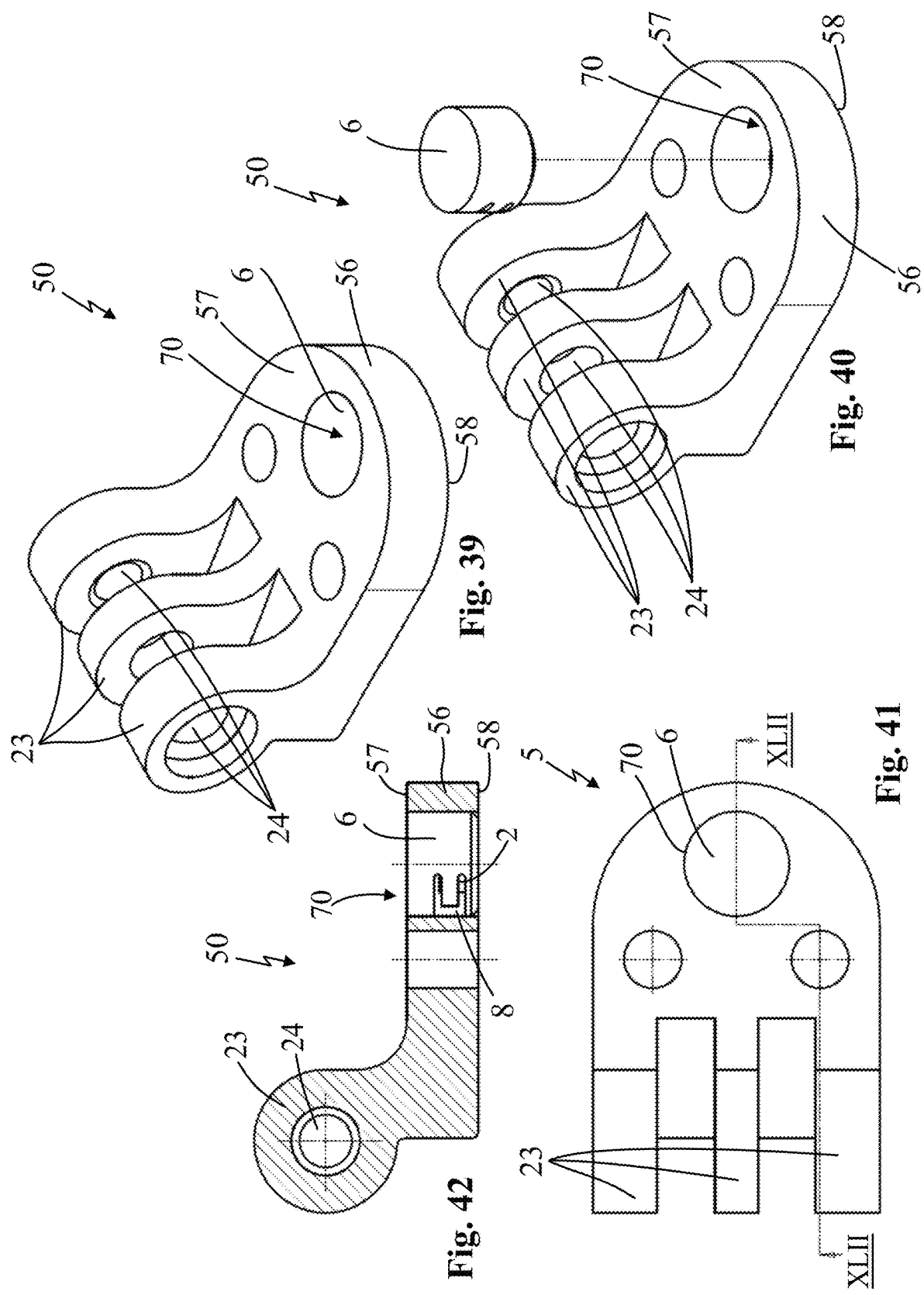

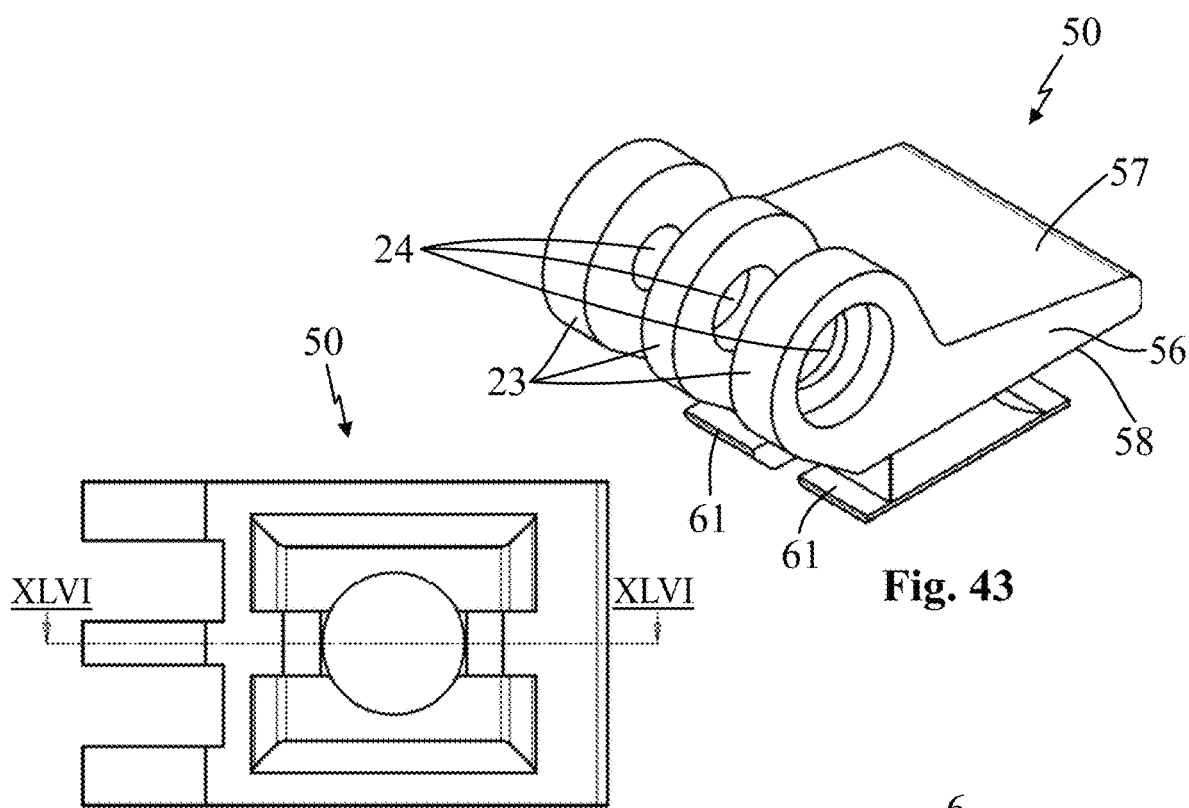
Fig. 43
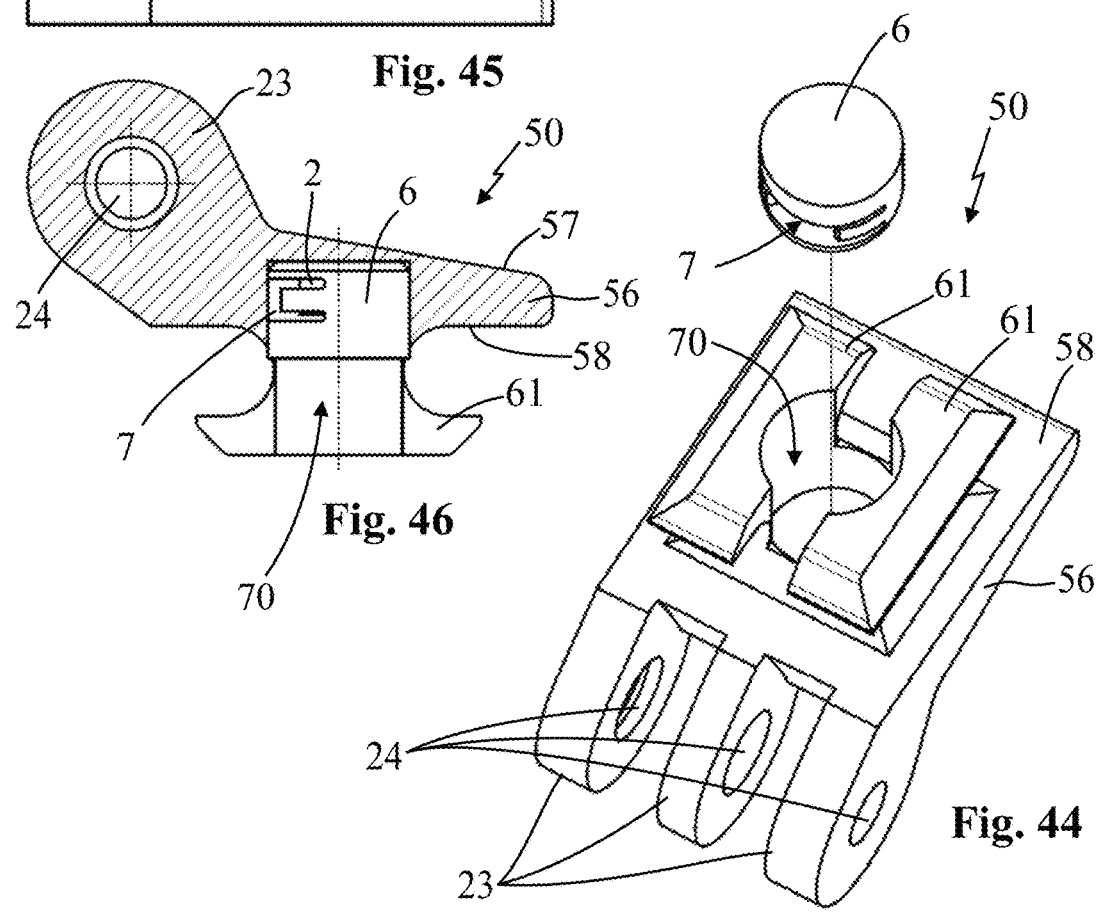
Fig. 45
Fig. 46
Fig. 44

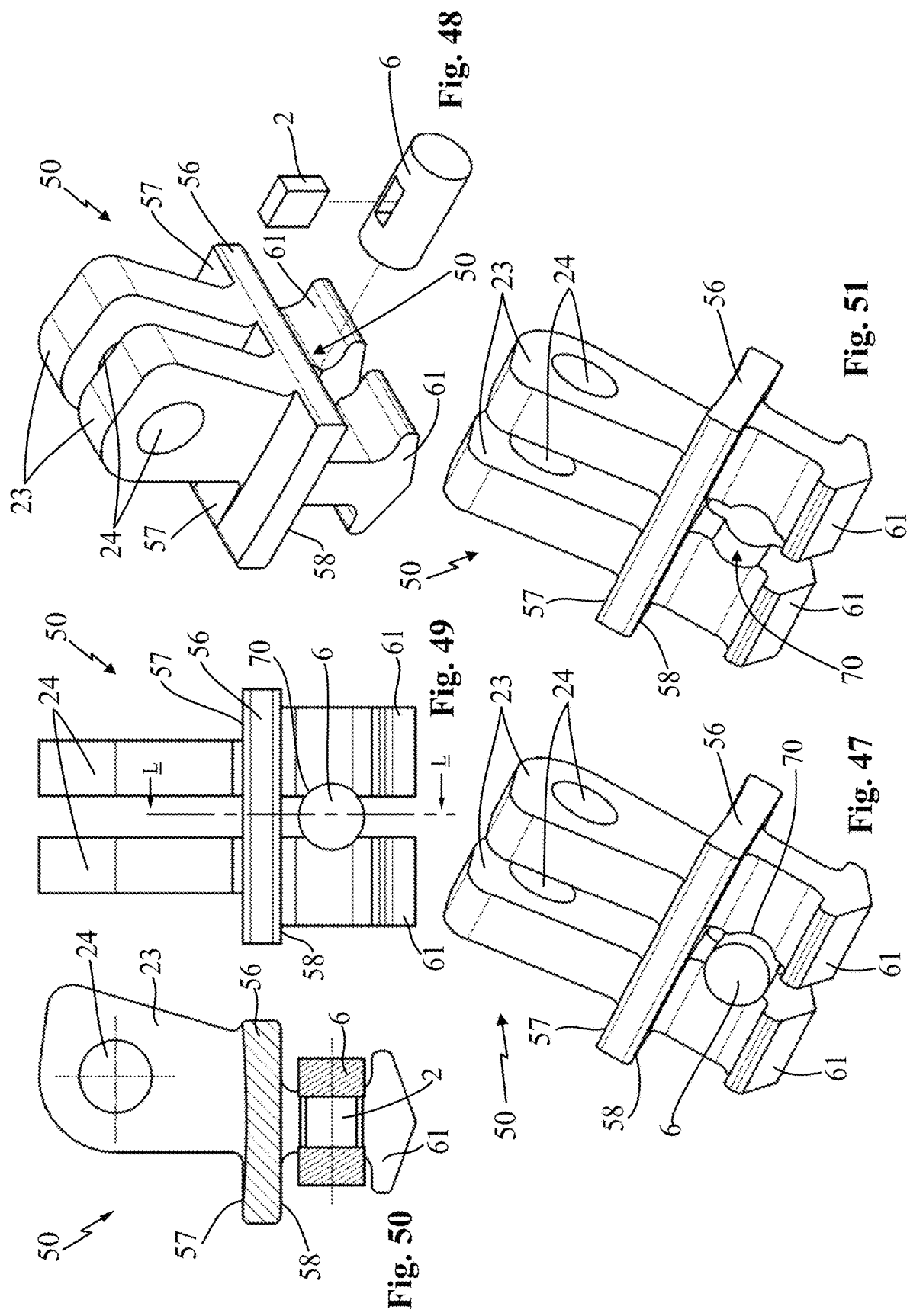

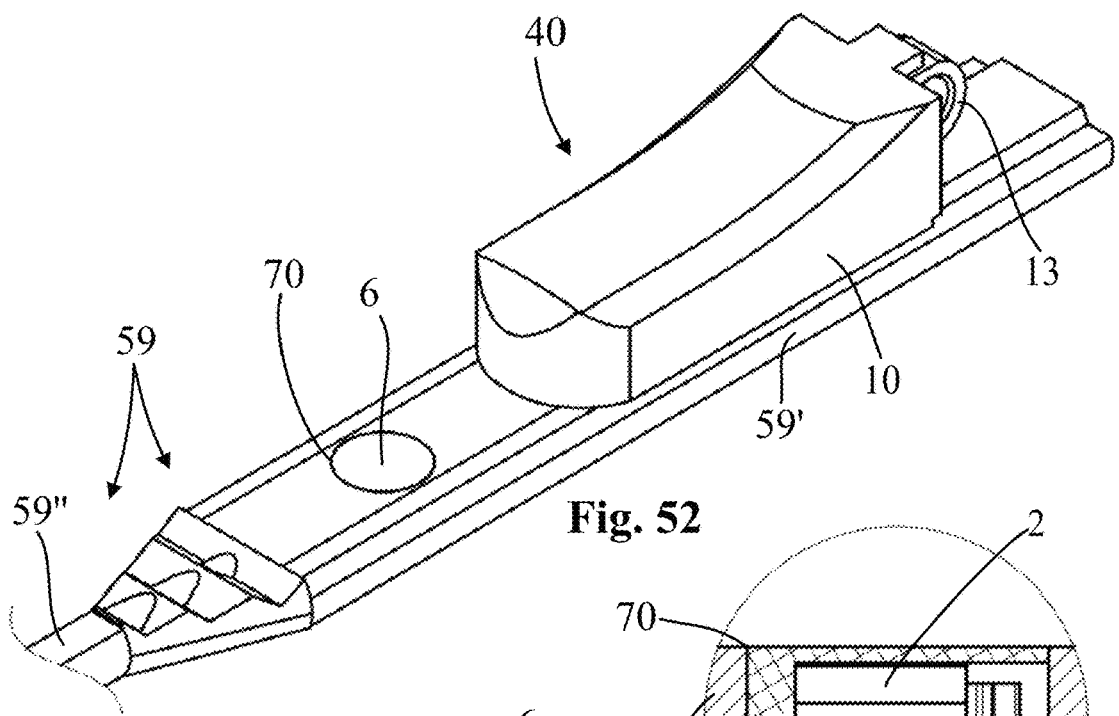
Fig. 52
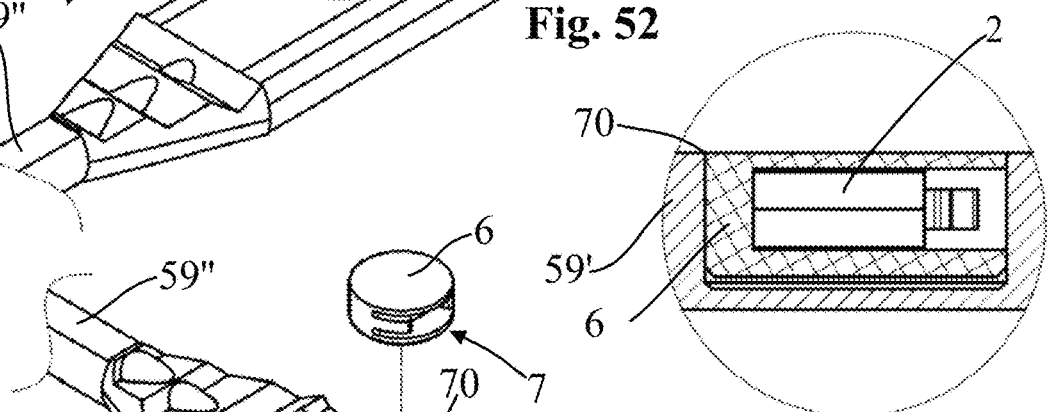
Fig. 55
Fig. 53
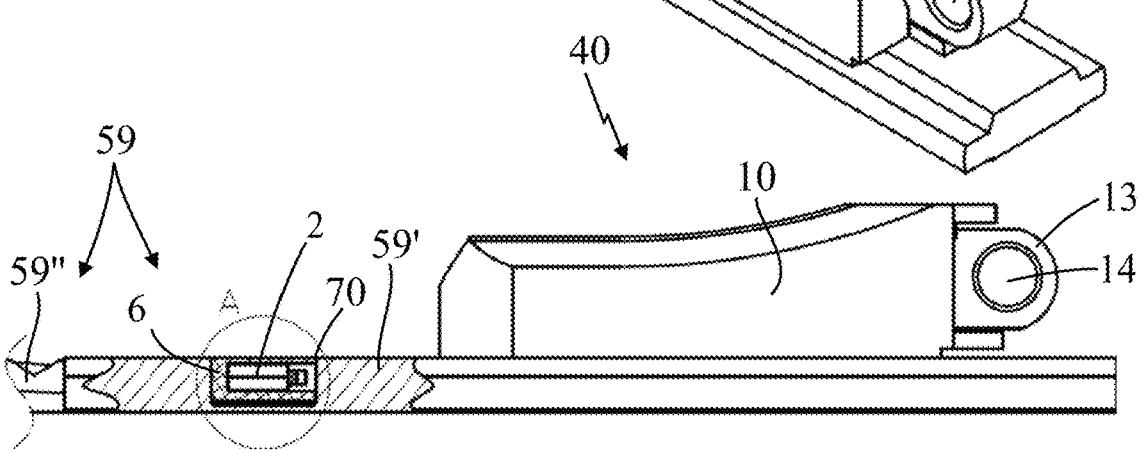
Fig. 54

US 10,747,020 B2

HINGE FOR EYEGLASSES

FIELD OF APPLICATION

The present invention regards a hinge for eyeglasses provided with a TAG assembly for the automatic identification and/or storage of information.

The present hinge for eyeglasses is inserted in the industrial field of eyeglasses and of the production of eyeglasses (and more specifically in the field of components for eyeglasses) and is advantageously intended to be employed on frames for eyeglasses of any kind, athletic or elegant, made of metal or plastic materials such as acetate.

The present TAG assembly of the hinge is advantageously intended to store data relative to the hinge itself and to provide such data to a reading device, for example for verifying the authenticity of the product through its identification code. Furthermore, the relative data stored in the TAG assembly can by way of example comprise specific information of the hinge for identifying the replacement pieces, information relative to the production factory, to the year of manufacturing, etc., or for storing further information in order to certify that the hinge has been subjected to a specific operation or control.

STATE OF THE ART

Data transmission systems are known on the market which comprise one or more TAG identification devices, also termed transponders, e.g. of RFID or NFC type, usually associated with labels, a receiving apparatus for reading the data of the TAG or for sending data to the TAG (transceiver apparatus), and an information system for managing the transfer of the data between the TAG and the receiving apparatus.

The identification device, also indicated hereinbelow simply with the term TAG, can be active or passive depending on whether it is provided or not provided with its own power supply.

The TAG of passive type is provided with a microchip that contains data in a memory, an antenna, and a physical support on which the chip and the antenna are mounted and which is constituted by a substrate generally made of Mylar, of a plastic film such as PET or PVC, of paper or of still other materials.

Since a battery is not provided for, the antenna receives a signal from the receiving apparatus, which by means of induction transforms into electrical energy, employable for power supplying the microchip. The latter, thus activated, is capable of transmitting the data contained therein by means of the antenna to the receiving apparatus. Hence, the TAG is capable of receiving and transmitting the data contained in a chip by means of radio frequency signals to the receiving apparatus (also known with the terms reader or transceiver).

Advantageously, the receiving apparatus is also capable of transmitting data to the TAG for the registration thereof within the chip memory.

Therefore, with the term TAG or transponder it must be intended hereinbelow passive electronic devices employable for the identification and/or storage of data associable with objects and capable of responding to remote interrogations by fixed or portable receiving apparatuses, termed readers (or also interrogators).

More in detail, known on the market are various TAG types, such as the type defined with the acronym RFID (Radio-Frequency IDentification) which by means of radio frequency allow a receiving apparatus (also termed only "reader") to communicate and/or update the information contained in the tags which it is interrogating. The receiving apparatus, notwithstanding its name, is able not only to receive and read data but also to write information on the memory of the RFID TAG.

Another known TAG available on the market is defined by NFC (Near Field Communication) standard which employs a frequency of 13.56 MHz and allows the exchange of information between reader and chip up to 10 cm.

In order to facilitate the installation of such TAG in the different products on the market, the same TAGs are well-known to be associated with supports of various type in order to form assemblies that can be more easily handled, also automatically by robots in industrial production processes. It is known for example to associate such TAGs with labels, in particular adhesives, in order to be able to affix them to products, even off-the-shelf products.

Known on the market are supports containing an identification device, which are connected in seats made on many different products. By way of example, in the eyeglass field it is known from the patent WO 2017/108981 to make a decorative insert that contains an identification device at its interior.

The TAG assemblies present on the market today have the drawback of not allowing easily mounting the TAG within the support or they involve production processes that no longer allow extracting the TAG once produced in its covering shell.

PRESENTATION OF THE INVENTION

In this situation, the problem underlying the present invention is to eliminate the drawbacks of the abovementioned prior art, by providing a hinge for eyeglasses which is capable of supporting a TAG assembly that can be assembled in a facilitated manner.

A further object of the present finding is to provide a hinge for eyeglasses, which even if comprising the TAG assembly does not negatively impact the sight.

A further object of the present finding is to provide a hinge for eyeglasses, which is structurally simple to make, with the aforesaid TAG assembly integrated therewith.

BRIEF DESCRIPTION OF THE DRAWINGS

The technical characteristics of the finding, according to the aforesaid objects, can be clearly seen in the contents of the below-reported claims and the advantages thereof will be more evident from the following detailed description, made with reference to the enclosed drawings, which represent several merely exemplifying and non-limiting embodiments of the invention, in which:

FIG. 1 shows a perspective view of a TAG assembly of the present hinge, in accordance with a first embodiment;

FIG. 2 shows the assembly of FIG. 1 in a second bottom perspective view;

FIG. 3 shows the assembly of FIG. 1 in a side view;

FIG. 4 shows the assembly of FIG. 3 in a cross section view made along the trace IV-IV of FIG. 3;

FIG. 5 shows a perspective view of the section of FIG. 4;

FIG. 6 shows a perspective view of the assembly of FIG. 1 with a TAG identification device illustrated in exploded view outside of a provided seat thereof in the support body of the assembly;

FIG. 7 shows the view of the assembly of FIG. 6 with the TAG identification device illustrated in exploded view outside the seat and with the support body of the assembly in perspective section as in FIG. 5;

FIG. 39 shows a female articulation of a second embodiment of a hinge according to the present invention in a perspective view;

FIG. 40 shows the female articulation of FIG. 39 with the TAG assembly extracted from the housing seat;

FIG. 41 shows the female articulation of FIG. 39 in a plan view;

FIG. 42 shows the female articulation of FIG. 39 in a longitudinal section view made along the trace XLII-XLII of FIG. 41;

FIG. 43 shows a female articulation of a third embodiment of a hinge according to the present invention in a perspective view;

FIG. 44 shows the female articulation of FIG. 43 in a bottom perspective view with the TAG assembly extracted from the housing seat;

FIG. 45 shows the female articulation of FIG. 43 in a plan view;

FIG. 46 shows the female articulation of FIG. 43 in a longitudinal section view made along the trace XLVI-XLVI of FIG. 45;

FIG. 47 shows a female articulation of a fourth embodiment of a hinge according to the present invention in a perspective view;

FIG. 48 shows the female articulation of FIG. 47 in a different perspective view with the TAG assembly extracted from its housing seat;

FIG. 49 shows the female articulation of FIG. 47 in a plan view;

FIG. 50 shows the female articulation of FIG. 47 in a longitudinal section view made along the trace L-L of FIG. 49;

FIG. 51 shows the female articulation of FIG. 47 in a different perspective view and without the TAG assembly;

FIG. 52 shows a male articulation of a fifth embodiment of a hinge according to the present invention in a perspective view;

FIG. 53 shows the male articulation of FIG. 52 with the TAG assembly extracted from the housing seat;

FIG. 54 shows the male articulation of FIG. 52 in a partial longitudinal section view;

FIG. 55 shows an enlarged detail of FIG. 54;

DETAILED DESCRIPTION OF A PREFERRED EMBODIMENT

Figure 10:
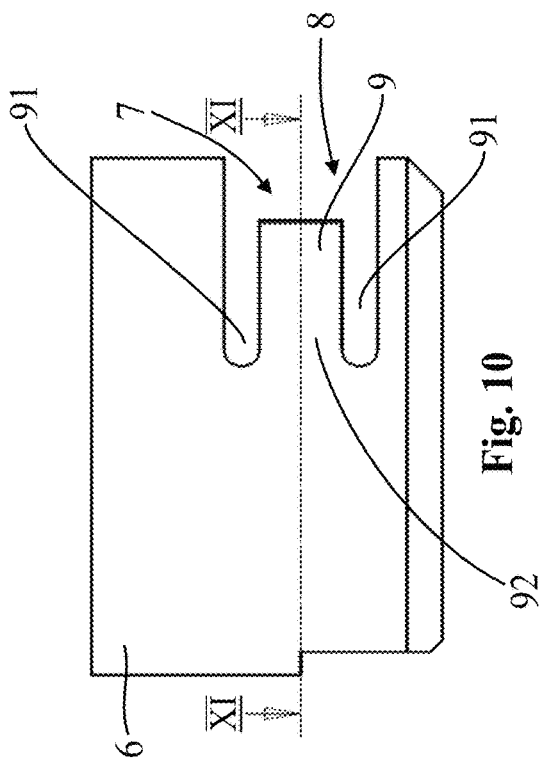
FIG. 10 shows the support body of the assembly of FIG. 8 in a side view.
Figure 11:
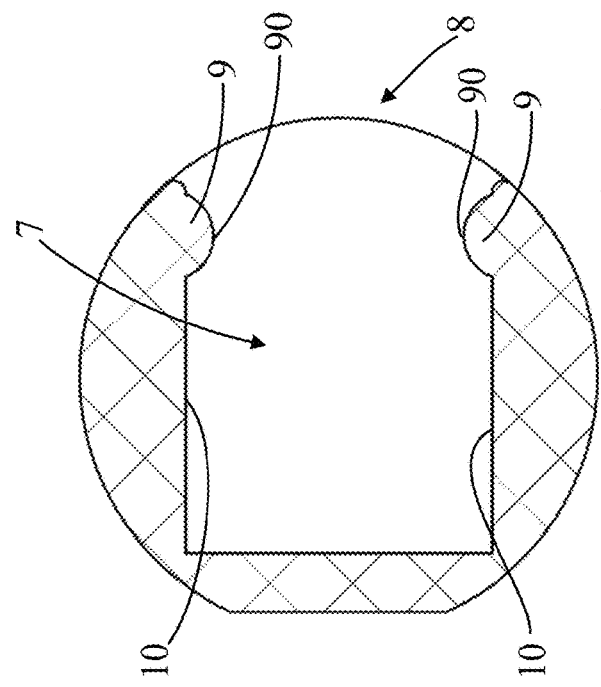
FIG. 11 shows the support body of the assembly of FIG. 10 in a cross section view made along the trace XI-XI of FIG. 10.
Figure 9:
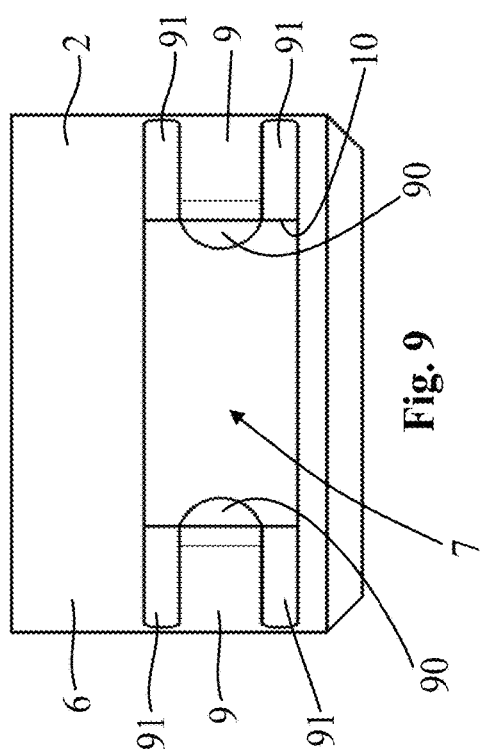
FIG. 9 shows the support body of the assembly of FIG. 8 in a front view.
Figure 8:
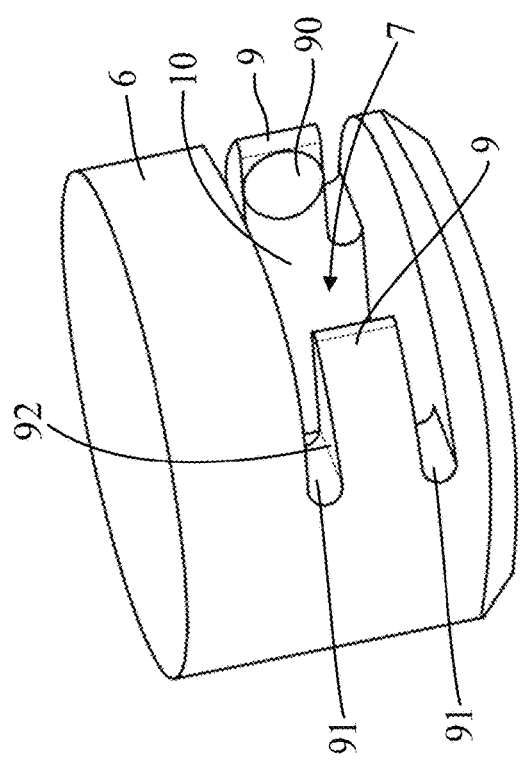
FIG. 8 shows a perspective view of the support body of the TAG assembly in accordance with a second embodiment.
Figure 13:
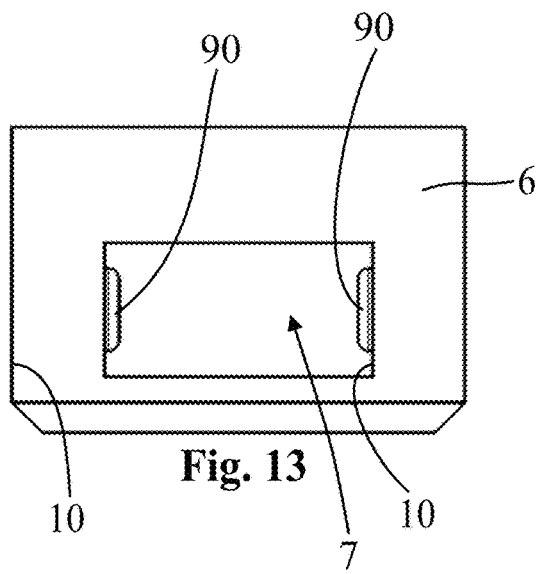
FIG. 13 shows the support body of the assembly of FIG. 12 in a front view.
Figure 14:
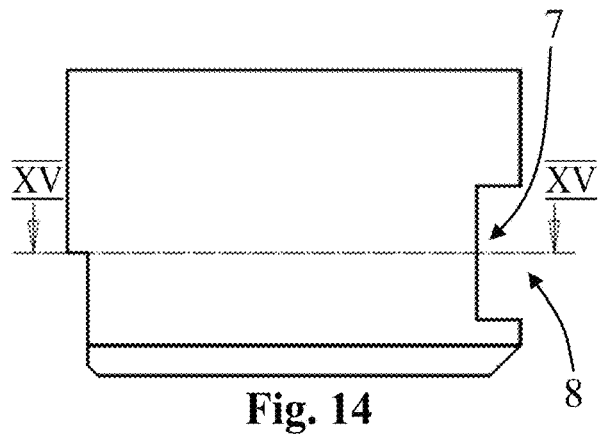
FIG. 14 shows the support body of the assembly of FIG. 12 in a side view.
Figure 15:
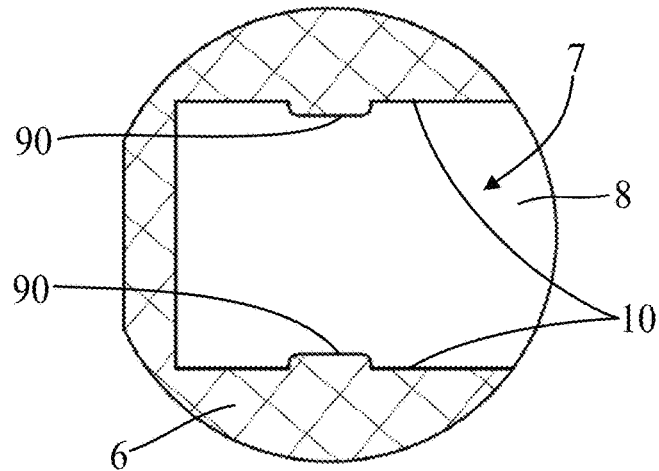
FIG. 15 shows the support body of the assembly of FIG. 14 in a cross section view made along the trace XV-XV of FIG. 14.
Figure 12:
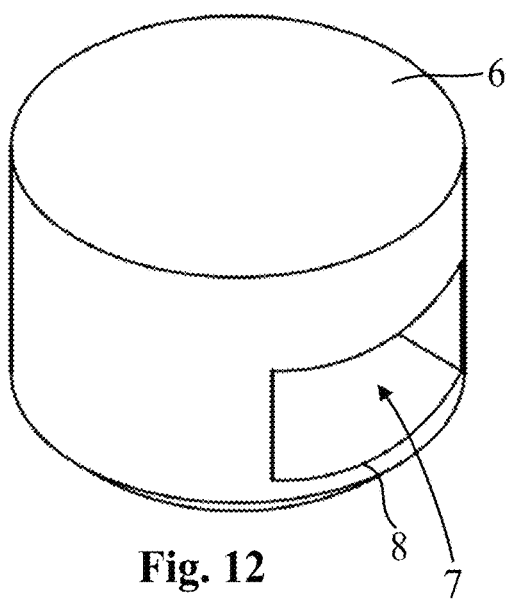
FIG. 12 shows a perspective view of the support body of the TAG assembly in accordance with a third embodiment.
Figure 16:
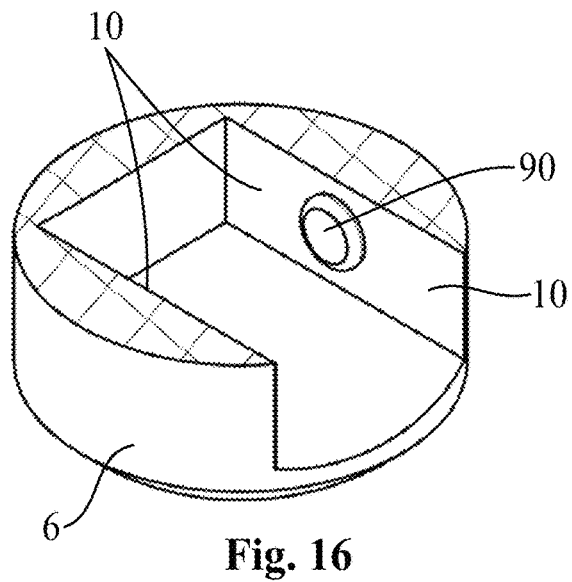
FIG. 16 shows a perspective view of the section of FIG. 15.
Figure 18:
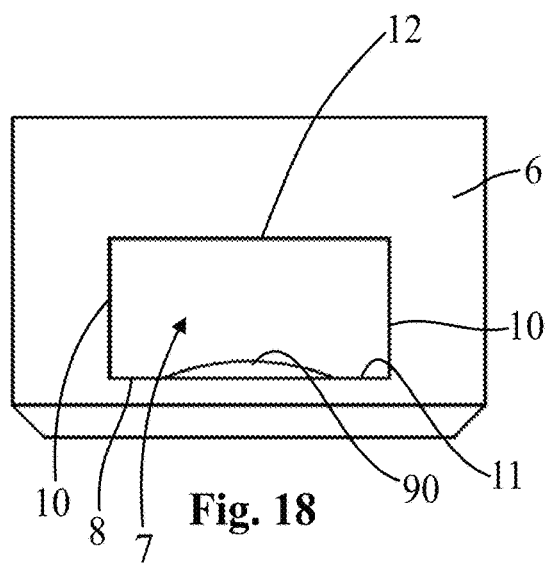
FIG. 18 shows the support body of the assembly of FIG. 17 in a front view.
Figure 19:
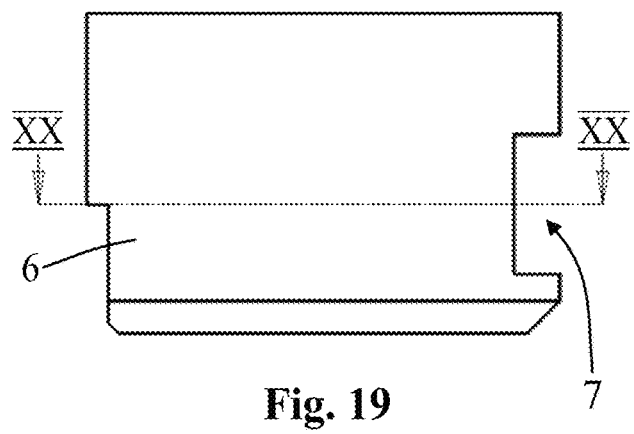
FIG. 19 shows the support body of the assembly of FIG. 17 in a side view.
Figure 20:
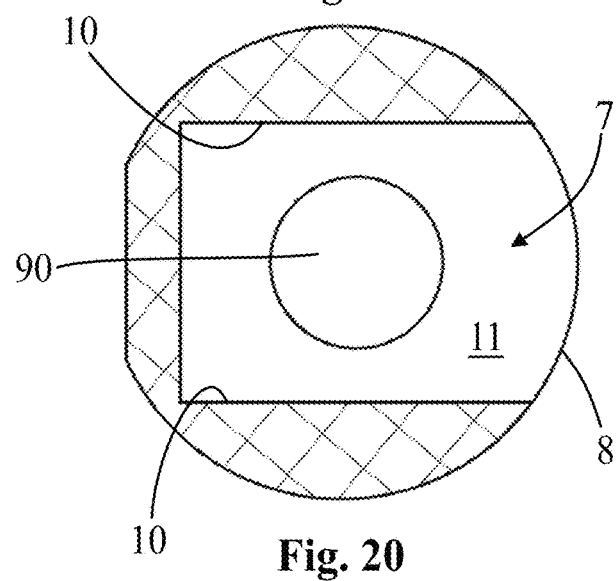
FIG. 20 shows the support body of the assembly of FIG. 19 in a cross section view made along the trace XX-XX of FIG. 19.
Figure 17:
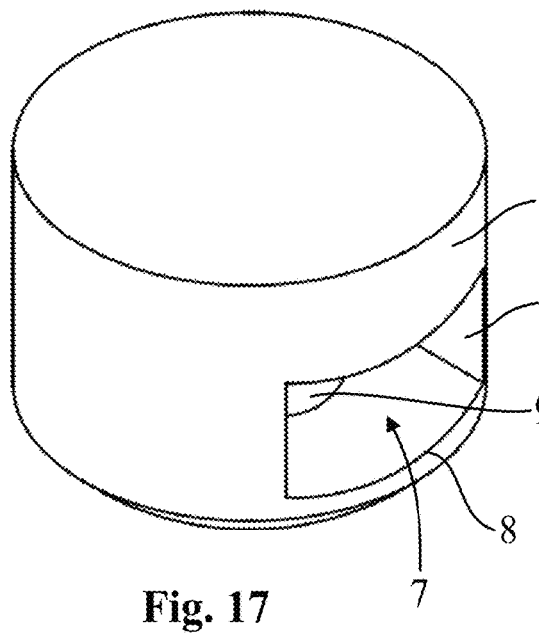
FIG. 17 shows a perspective view of the support body of the TAG assembly in accordance with a fourth embodiment.
Figure 21:
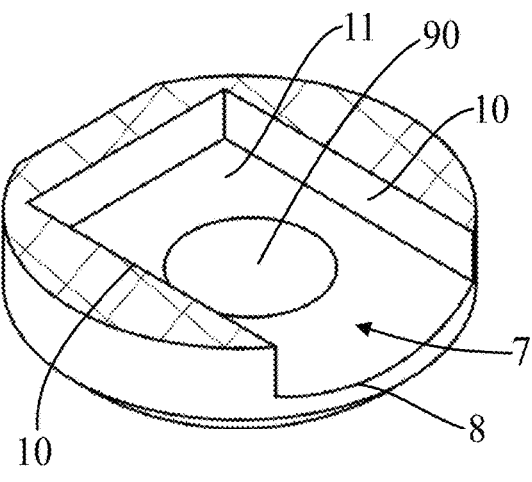
FIG. 21 shows a perspective view of the section of FIG. 20.
Figure 23:
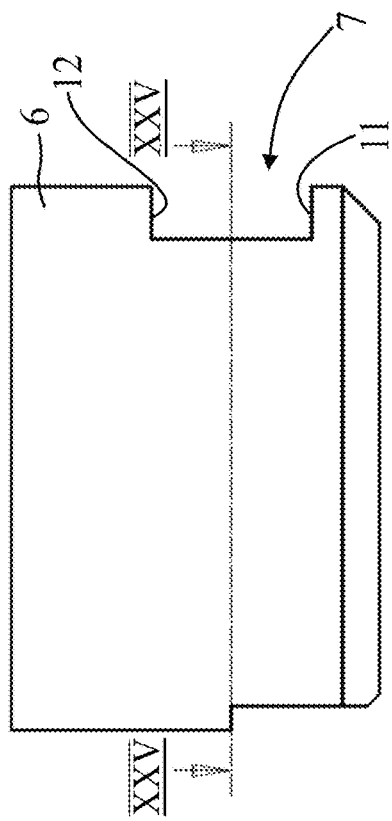
FIG. 23 shows the support body of the assembly of FIG. 22 in a front view.
Figure 24:
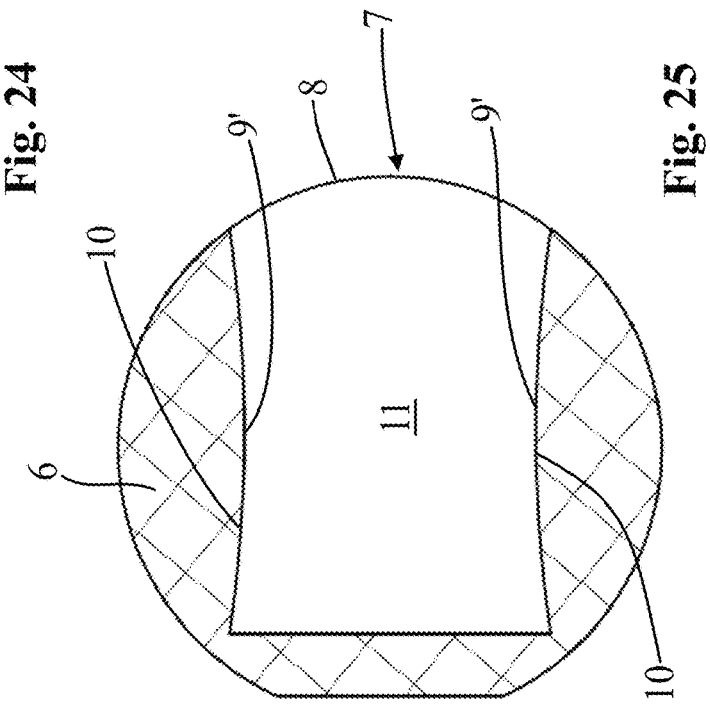
FIG. 24 shows the support body of the assembly of FIG. 22 in a side view.
Figure 22:
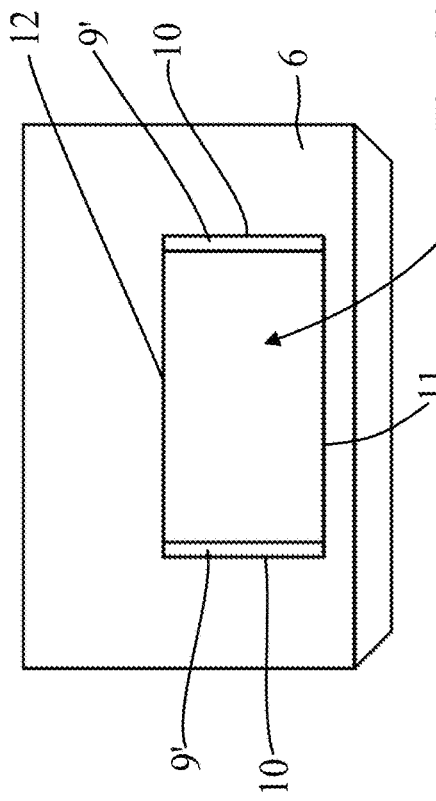
FIG. 22 shows a perspective view of the support body of the TAG assembly in accordance with a fifth embodiment.
Figure 25:
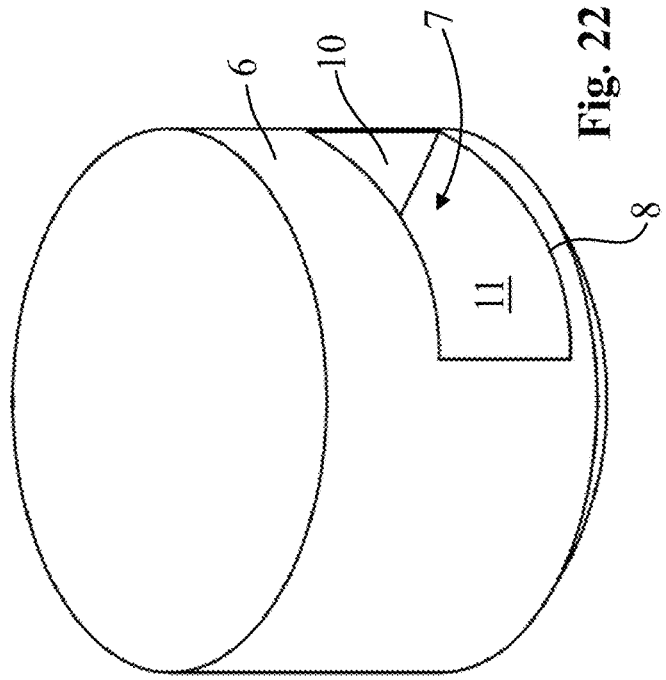
FIG. 25 shows the support body of the assembly of FIG. 24 in a cross section view made along the trace XXV-XXV of FIG. 24.
Figure 27:
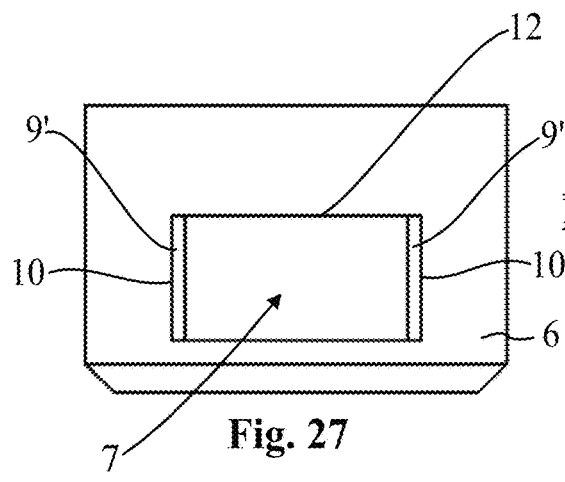
FIG. 27 shows the support body of the assembly of FIG. 26 in a front view.
Figure 28:
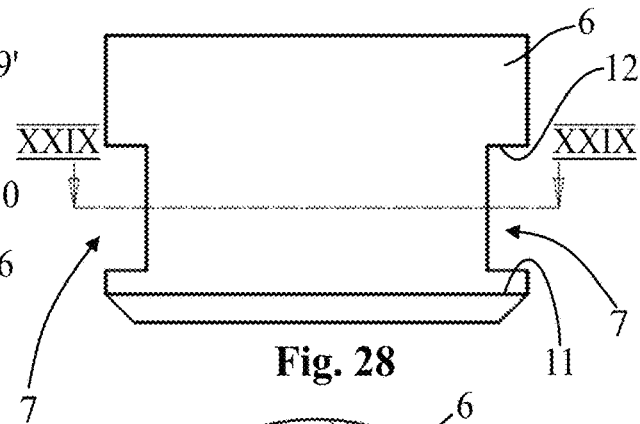
FIG. 28 shows the support body of the assembly of FIG. 26 in a side view.
Figure 29:
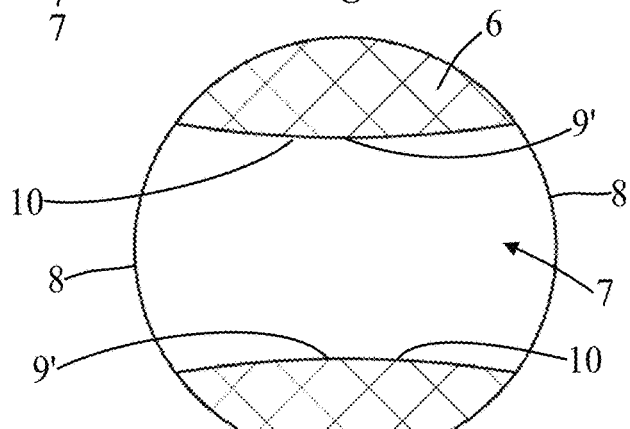
FIG. 29 shows the support body of the assembly of FIG. 28 in a cross section view made along the trace XXIX-XXIX of FIG. 28.
Figure 30:
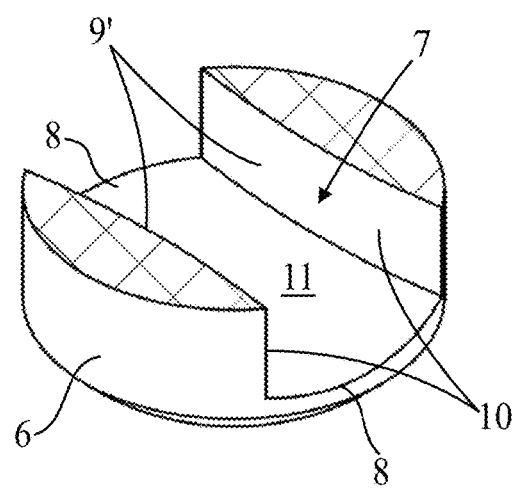
FIG. 30 shows a perspective view of the section of FIG. 29.
Figure 26:
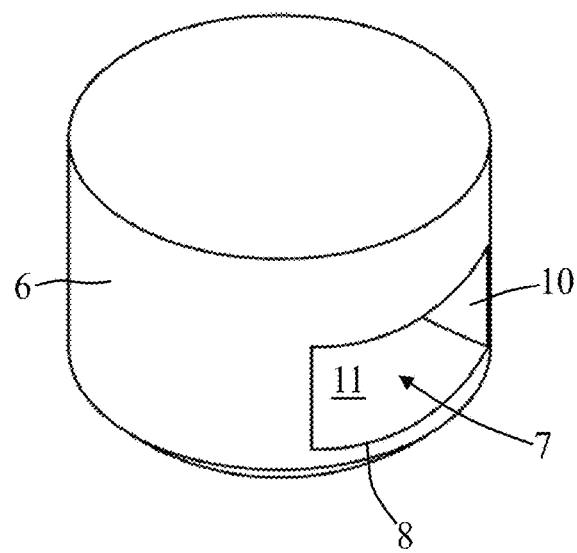
FIG. 26 shows a perspective view of the support body of the TAG assembly in accordance with a sixth embodiment.
Figure 32:
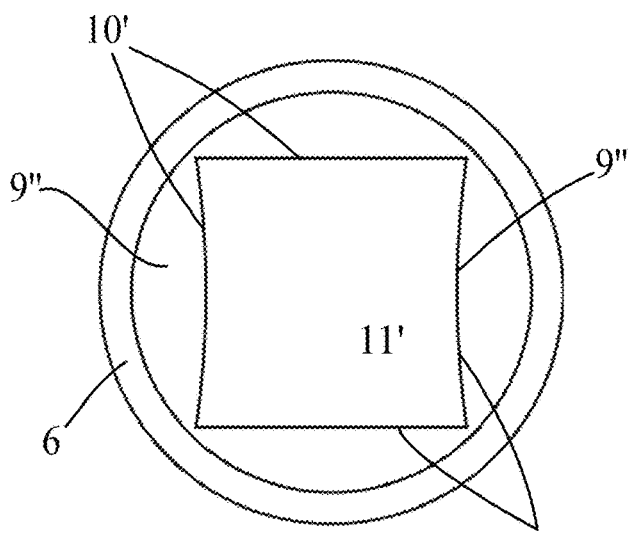
FIG. 32 shows the support body of the assembly of FIG. 31 in a bottom view.
Figure 34:
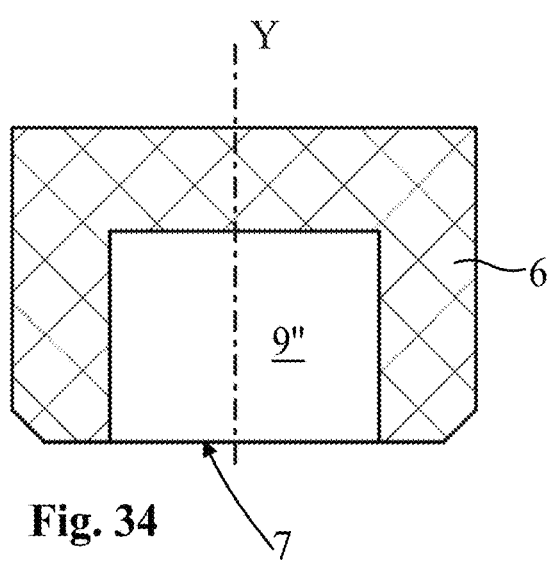
FIG. 34 shows the support body of the assembly of FIG. 33 in a cross section view made along the trace XXXIV-XXXIV of FIG. 33.
Figure 33:
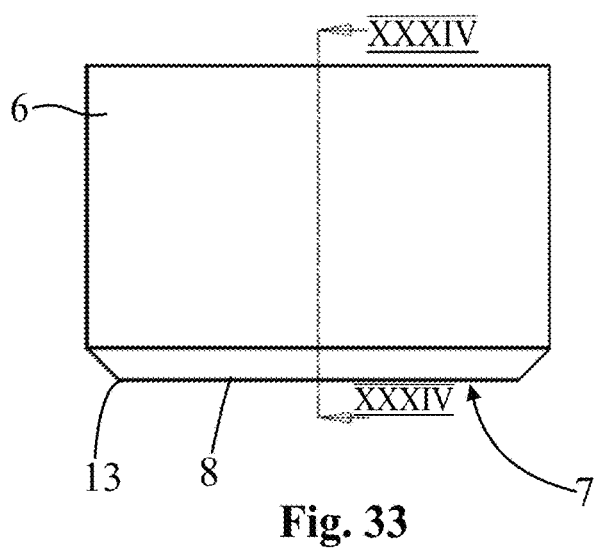
FIG. 33 shows the support body of the assembly of FIG. 31 in a side view.
Figure 31:
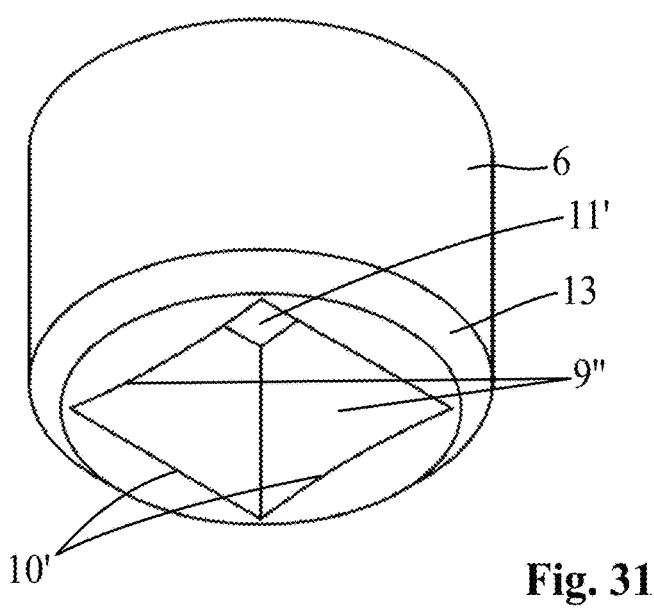
FIG. 31 shows a perspective view of the support body of a TAG assembly for the automatic identification and/or storage of information in accordance with a seventh embodiment.
Figure 35:
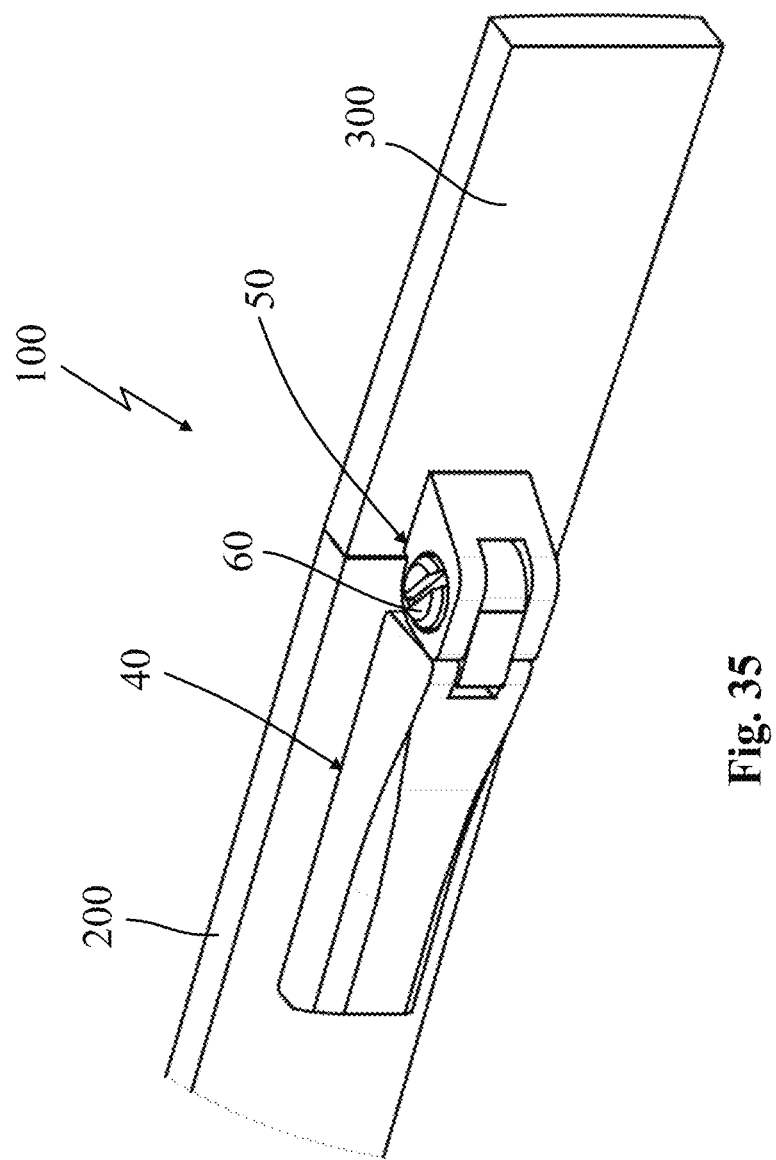
FIG. 35 shows a perspective view of one embodiment of the present hinge.

Reference number 100 overall indicates the hinge for eyeglasses, object of the present invention.

The hinge 100 is intended for making the eyeglass frames of conventional as well as athletic type and is, in a per se known manner, adapted to mutually articulate together a temple 200 with respect to an end piece 300 of an eyeglass frame. The frame can be made of metal material, of plastic material, such as acetate, or of other materials suitable for this purpose.

More in detail, the frame is usually formed, in a per se known conventional manner, by a front that supports a pair of lenses, connected in the central part by a bridge, and by a pair of temples 200 pivoted by means of hinges 100 to the sides of the front and, more precisely, to two lateral portions thereof directed towards the rear part of the eyeglasses and known in the technical jargon of the field with the term end pieces 300.

The hinge 100 comprises, in a per se entirely conventional manner, two articulation elements 40 and 50, of which a first 40 is mechanically associated with a first component of the eyeglass frame, and a second articulation element 50 mechanically associated with a second component of the eyeglass frame.

More in detail, one component of the frame is constituted by a temple 200 and the other is constituted by the end piece 300 of the frame. One articulation element is of male type and is mechanically associated with one component of the eyeglass frame while the other articulation element is of female type and is mechanically associated with the other component of the eyeglass frame.

For example, in the case of flex hinges, the male articulation element indicated with 40 is associated with a temple 200 while the second female articulation element 50 has been associated with the end piece 300, nevertheless able to generally provide for a reversal of the position of the articulation elements 40 and 50 with respect to the two components of the frame without departing from the protective scope of the present patent.

Both articulation elements 40 and 50 are preferably made of metal and are mutually pivoted together by means of a hinge pin 60, e.g. a screw.

The male articulation element (indicated with 40 in the enclosed figures) comprises at least one head portion 13 provided with a first eyelet 14 while the female articulation element (indicated with 50 in the enclosed figures) is constituted by a body, preferably metallic, shaped as a fork provided with at least two facing shoulders 23 that are parallel to each other, between which the head portion 13 of the first articulation element 4 is housed in an interposed manner.

Each shoulder 23 is provided with a second eyelet 24 which is aligned with that of the other shoulder 23 as well as with the first eyelet 14 of the head portion 13.

The three aligned eyelets axially house the hinge pin 60 adapted to allow the relative rotation of the two articulation elements 40 and 50.

In the embodiments illustrated in the enclosed figures, the hinge 100 is obtained with the articulation elements 40 and 50, indicated as elements originally separated from the relative temples 200 and end piece 300; however, without departing from the protective scope of the present patent, these elements could, at least in some components thereof, be made directly on the temple 200 and on the end piece 300.

The first and the second articulation elements 40 and 50 are therefore rigidly fixed in a mutually approached position with respect to the temples 200 and to the end pieces 300, respectively, of a frame according to conventional techniques, such as welding, well-known to the man skilled in the art and for this reason not described in detail hereinbelow.

According to the invention, the hinge 100 comprises at least one housing seat 70 made in at least one of the shaped articulation elements 40, 50, and a TAG assembly 1 housed within such housing seat 70.

The TAG assembly 1 is mechanically associated with the hinge 100 for the automatic identification and/or storage of information relative to the hinge 10 itself. Typically, such information will be relative to the characteristics of the hinge 100 with which the TAG assembly 1 is associated, and in particular such information can contain an identification code for authenticating the hinge 100 in particular relative to its production source.

More in detail, the TAG assembly 1 comprises at least one TAG electronic identification device 2, provided with at least one support layer 3 (e.g. constituted by an electronic circuit board), with at least one antenna 4 and with at least one chip 5 mounted on the support layer and connected to the antenna 4.

The TAG electronic identification device 2 is of passive type, for example known in the market with the abbreviations RFID or NFC which refer to consolidated transmission standards; of course, the standard of the passive TAG 2 can also be different from the RFID or NFC ones, without departing from the protective scope of the present patent.

The TAG assembly 1 also comprises a support body 6 which at its interior contains the TAG electronic device 2 and which is configured for being inserted in the housing seat 70 of the hinge 100, which preferably has a shape at least partly substantially counter-shaped with respect to that of the support body 6.

The support body 6 can be made of any one material but preferably this will be made of plastic material, in particular plastic material for molding.

In accordance with the idea underlying the present invention, the support body 6 is provided with a seat 7, which removably houses the TAG electronic device 2, and is provided with at least one opening 8 for the insertion of the TAG electronic device 2 in the seat 7.

According to the invention, the support body 6 is also provided with at least one elastically pliable portion 9, which at least partially defines the seat 7 and intercepts the TAG electronic device 2 in order to retain it within the seat 7 itself.

The support body 6 is configured for housing and protecting the TAG electronic identification device 2, in a manner such that the TAG assembly 1 can be applied to the hinge 100 without the TAG electronic identification device 2 sustaining damage or being subjected to failures.

Advantageously, the TAG electronic identification device 2 is arranged entirely within the seat 7 of the support body 6, in a manner such that the TAG electronic device 2 does not project beyond the edge of the support body 6 itself. This allows in particular easily applying the TAG assembly 1 to the product, inserting the support body 6 in the corresponding seat for housing the product without risk of damaging the TAG identification device 2.

Preferably, the support body 6, in order to act as support and protection of the TAG electronic device 2 so to allow the application thereof to the corresponding product, does not comprise any electrical or electronic component and, in particular, does not comprise any TAG electronic reader, since the present TAG assembly is adapted to only contain the TAG electronic device 2 that forms the transponder. Functionally, TAG electronic device 2 is intended to be interrogated by a reader outside the TAG assembly 1 in order to allow such reader to retrieve the information contained in the chip 5 of the TAG electronic identification device 2.

Advantageously, the support body 6 is completely made of dielectric material.

Preferably, the support body 6 is completely made of electrically insulating material and/or non-ferromagnetic material, such as plastic material (e.g. polycarbonate), in particular so as to not interfere with the transceiving of the signals by the antenna 4 of the TAG electronic identification device 2.

Suitably, the support body 6 is extended width-wise and length-wise according to an extension plane (arranged, for example, parallel to the support layer 3 of the TAG identification device 2), and is also extended height-wise along a direction orthogonal to such extension plane.

Advantageously, the support body 6 has width and/or length substantially comprised between 1 and 4 millimeters and, preferably, between about 1.50 and 3 millimeters, in particular of about 2.20 millimeters.

Advantageously, the support body 6 has height substantially comprised between 1 and 4 millimeters and, preferably, between about 1 and 2 millimeters, in particular of about 1.50 millimeters.

Such dimensions render the support body 6 (and hence the TAG assembly 1) particularly suitable for being permanently applied in the housing seat 70 of the hinge 100, which in particular has small-size components.

Preferably, the support body 6 is made of a single body, in particular by means of molding.

Advantageously, the elastically pliable portion 9 of the support body 6 is an integral part of the same support body 6, being obtained integrally with the remaining part of the support body 6.

Therefore, according to the invention, the TAG assembly 1 can be easily assembled, before being employed for associating with the product to be identified. The TAG assembly 1 thus obtained is shaped in order to be easily handled by automatic means in industrial processes that provide for the association thereof to products, in particular basic commodities such as bags, suitcases, watches, eyeglasses, etc. By way of example, the assembly 1 thus obtained can be inserted in a cavity made in the product to be identified.

In accordance with the first embodiment of the TAG assembly according to the invention, illustrated in FIGS. 1-7, the elastically pliable portion is obtained with at least one tab, which projects into the opening 8 of the seat 7, partially limiting it so as to be susceptible of interfering with the TAG electronic device 2 during its insertion in the same seat 7 in an assembly step of the assembly 1.

Advantageously, in accordance with the example of the enclosed FIGS. 1-7, two tabs 9 are provided which are extended from opposite lateral walls 10 of the seat 7. Preferably, such tabs 9 terminate at their ends with enlarged head portions aimed to better retain the TAG electronic device 2 within the seat 7.

Advantageously, the tabs 9 are delimited above and below by two slits 91 and are extended in a curved manner starting from a base portion 92 thereof at the end of the two slits 91.

Preferably, the TAG electronic device 2 and the seat 7 have corresponding shapes for an improved and more stable housing of the TAG device in the support body 6.

In accordance with the variant represented by the second embodiment illustrated in the enclosed FIGS. 8-11, at least one tab 9 is provided with a protruding nosepiece 90 made on one face of the tab 9 directed towards the interior of the seat 7 and is susceptible of retaining the TAG within the seat 7. For example, the protruding nosepiece is made of spherical cap form.

In operation, the TAG electronic device 2 during the insertion within the seat 7 interferes with the tabs 9 placed as a narrowing delimitation of the opening 8, elastically opening them up so to allow the introduction of the TAG electronic device 2 through the same opening 8 and its complete introduction within the seat 7. In the latter position, in which the TAG electronic device 2 is completely inserted in the seat 7, the tabs are advantageously elastically returned into the original position in which they limit the opening 8 of the seat 7 and thus prevent the TAG electronic device 2 from exiting therefrom.

In accordance with a third embodiment illustrated in the enclosed FIGS. 12-16 the elastically pliable element 9 is a nosepiece 90 protruding directly from at least one of the lateral walls 10 which delimit the seat 7. Advantageously, the nosepiece is provided in a middle position of the lateral walls 10. In addition, such nosepiece 90 is susceptible of retaining via interference the TAG electronic device 2 in the seat 7. Such nosepiece 90 for such purpose is susceptible of interfering with the TAG electronic device 2 during its insertion and of being elastically deformed even in a limited manner in order to retain the same TAG electronic device 2. Preferably, in accordance with the third embodiment of the enclosed figures, two nosepieces 90 are provided on two opposite lateral walls 10 of the seat 7; in this manner, the TAG electronic device 2 remains firmly retained and interposed between the two opposite protruding nosepieces 90.

In accordance with a fourth embodiment illustrated in the enclosed FIGS. 17-21 the elastically pliable element 9 is a nosepiece 90 protruding directing from at least one bottom wall 11 of the seat 7, in particular arranged centrally with respect to such bottom wall 11 and susceptible of retaining via interference said TAG electronic device 2 in such seat 7. In accordance with a non-illustrated embodiment, also two (or more) protruding nosepieces 90 can be provided for, of which at least one is on the aforesaid bottom wall 11 and at least another on the opposite upper wall 12.

In accordance with a fifth, a sixth and a seventh embodiment respectively illustrated in FIGS. 22-25, 26-30 and 31-35, the elastically pliable element 9 is constituted by at least one convex portion 9' of at least one wall of the seat 7. Consequently, the TAG electronic device 2 is retained in the seat 7 due to the interference exerted against the convex portion 9' of the aforesaid wall. The latter, even if only a little bit, is elastically deformed in order to allow the insertion of the TAG electronic device 2, consequently exerting a reaction force that blocks the same TAG electronic device 2 in the seat 7. Advantageously the convexity regards the entire aforesaid wall.

In accordance with the fifth embodiment, each of the two substantially opposite lateral walls 10 is provided with the aforesaid convex portion 9'. In this manner, the TAG electronic device 2 is interposed and retained between the convex portions 9' of the two opposite lateral walls 10.

In accordance with the variant represented by the sixth embodiment, the seat 7 is of through type, extended from two diametrically opposite portions of the cylindrical support body 6 with the two lateral walls 10 of convex form.

In accordance with an embodiment not represented in the enclosed figures, the elastically pliable portion 9 is constituted by a convex portion 9' of the bottom wall 11 of the seat 7 and advantageously the convex portion 9' covers the entire bottom wall 11; also in this case, the TAG electronic device 2 is retained in the seat 7 via interference with the convex portion 9', represented herein by the bottom wall 11.

In accordance with a further non-illustrated embodiment two convex portions 9' can be provided for, of which at least one is on the aforesaid bottom wall 11 and at least another on the opposite upper wall 12.

In accordance with all the embodiments illustrated up to now, the support body 6 advantageously has cylindrical shape and the seat 7 is made transverse to the axis Y of the cylindrical support body 6, in particular in flattened slit form, i.e. in particular with a height of the slit less than a third of its width.

In accordance with the eighth embodiment illustrated in the enclosed FIGS. 31-34, the substantially cylindrical support body 6 has the seat 7 made along the axis of the cylindrical support body 6 starting from an external end face 13 of the same cylindrical support body 6. The elastically pliable portion 9 is in this case constituted by at least one convex portion 9" of at least one lateral wall 10' of the seat 7. Also in this case, the TAG electronic device 2 is retained in the seat 7 due to the interference with the convex portion 9" of the aforesaid lateral wall 10'.

In accordance with the example of the enclosed figures, the seat 7 is obtained with four perimeter walls 10' and with a bottom 11'; two opposite walls of the four perimeter walls are covered by the aforesaid convex surface 9". The seat 7 is preferably accessible below the cylindrical support body 6.

A method is described hereinbelow for attaining a TAG assembly 1 provided with a tab 9 according to the above-reported description, regarding which the same reference numbers will be maintained for the sake of description simplicity.

The method therefore provides for arranging the support body 6 with the provided tab 9 or provided tabs (in accordance with the example in which two tabs are provided that are extended from opposite walls of the seat 7), each placed in a rest position delimiting the opening 8 of the seat 7 to a size smaller than the size of the TAG electronic device 2.

At this point, there is the insertion of the TAG electronic device 2 in the opening 8 of the seat 7, during which there is first the interception by the TAG electronic device 2 of the at least one tab 9 with elastic deformation of the latter in an open position aimed to enlarge the opening 8 to at least the size of the TAG electronic device 2, and then the TAG electronic device 2 goes beyond the tab 9, with the housing of such device within the seat 7 and with consequent release of the tab 9 in rest position.

In accordance with the embodiments illustrated in FIGS. 36-51, the second articulation element 50 (in particular of female type) is provided with a base support 56 from which one or more shoulders 53 are projectingly extended and provided with corresponding holes 54 for the insertion of the hinge pin. Such base support 50 is provided with a lower surface 58 intended for fixing the second component of the frame, and with an opposite visible surface 57 on which the housing seat 70 is made. In accordance with a particular embodiment variant, the housing seat 70 can be preferably provided with at least one slit (not illustrated) which is extended up to the margin of the base support 56 and preferably has width smaller than that of the housing seat 70.

Figure 37:
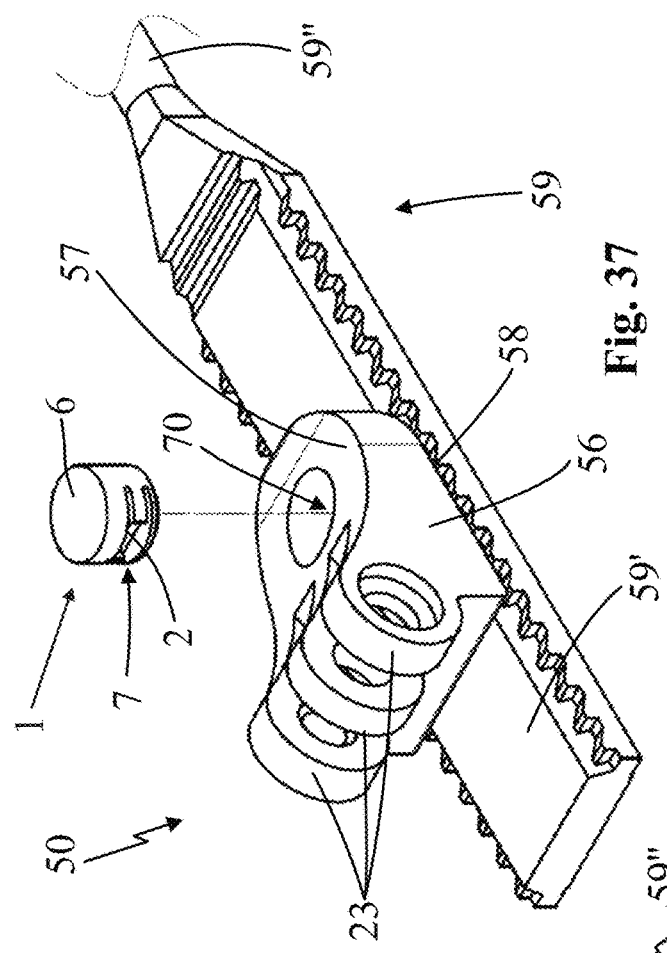
FIG. 37 shows the female articulation of FIG. 36 with the TAG assembly extracted from its housing seat.
Figure 36:
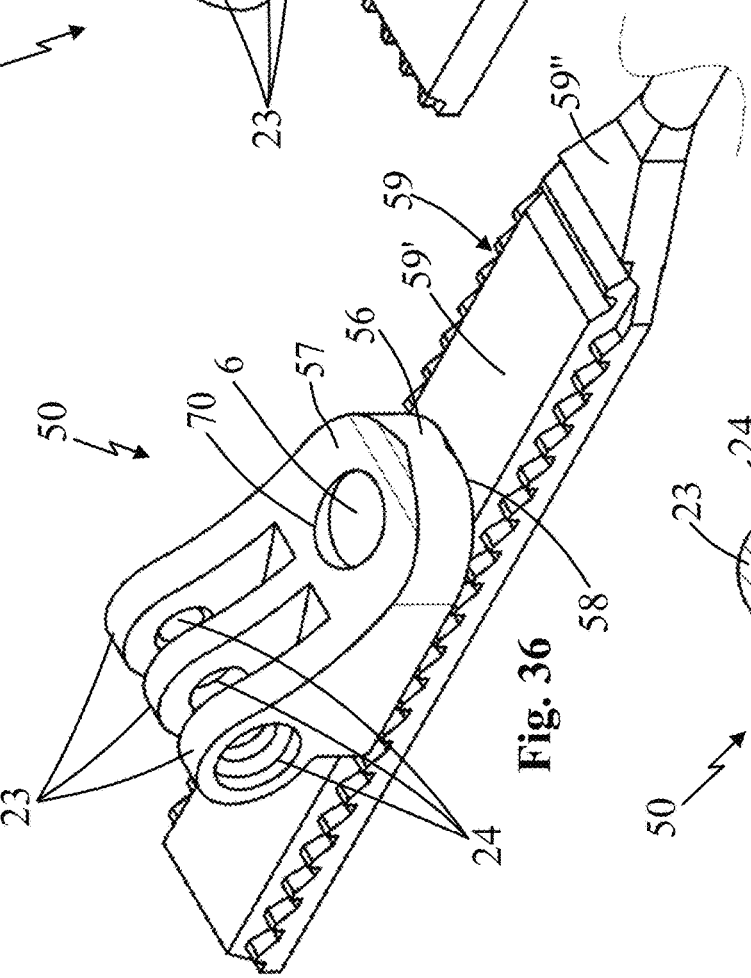
FIG. 36 shows a female articulation of a first embodiment of a hinge according to the present invention in a perspective view.
Figure 38:
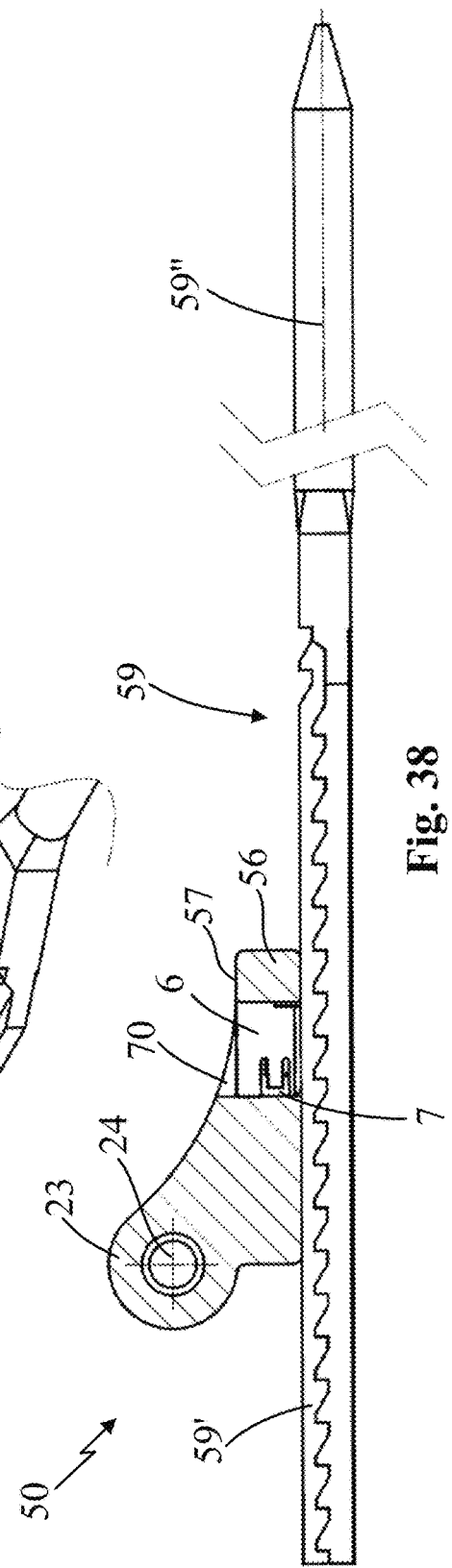
FIG. 38 shows the female articulation of FIG. 36 in a longitudinal section view.

Advantageously, with reference to the example of FIGS. 36-38, the base support 56 of the shaped articulation element of female type 50 is provided with a lower surface 58 fixed to a core 59 intended to be embedded in the plastic material of a temple 200 of the frame. More in detail, the core 59 comprises an enlarged plate 59' carrying, fixed thereto, the articulation element 50 and an elongated rod 59" fixed to one end of the enlarged plate 59' and intended to be forcibly inserted longitudinally within the plastic matrix of the temple 200.

Advantageously, the housing seat 70 is in the form of a through hole closed by a bottom constituted by the enlarged plate 59', against which the aforesaid support body 6 of the TAG assembly 1 is advantageously abutted. Otherwise, it can be provided that the housing seat 70 is made of a blind hole and that the support body 6 abuts against the base of said blind hole.

With reference to the hinge embodiment illustrated in FIGS. 39-42, the shaped female articulation element 50 is fixed to the frame (whether the temple or the end piece) by means of screws (nevertheless, instead of screws, pins or rivets could also be provided) insertable in through holes made in the base support 56. The latter bears the housing seat 70 for the insertion of the support body 6 of the TAG assembly 1, analogous to the preceding example. Otherwise, the shaped female articulation element 50 can be fixed to the frame by welding the lower surface 58 of the base support 56 to the relative component of the frame.

In accordance with the hinge embodiments respectively illustrated in the enclosed FIGS. 43-46 and 47-51, from the lower surface 58 of the base support 56 of the shaped female articulation element 50, at least one undercut element 61 is extended (as well as preferably two undercut elements 61 side-by-side this) that is intended to be engaged within the plastic matrix of a component of the eyeglass frame.

In accordance with such embodiments, the housing seat 70 is at least partially made in such undercut element 61. In such housing seat 70, the TAG assembly 1 is fixed through the support body 6 as in the examples of the preceding embodiments.

More in detail, in accordance with the embodiment illustrated in FIGS. 43-46, the housing seat 70 is made in advantageously circular hole form, within such at least one undercut element 61. Such hole is extended from the lower end of such undercut element 61 towards the base support 56, preferably partly covering the thickness of such base support 56. Advantageously, two undercut elements 61 are provided and the housing seat 70 is obtained with a hole made centrally with respect to the two undercut elements 61, astride the same, and advantageously with milling that only partially covers one face of each of such undercut elements 61.

Otherwise, with reference to the embodiment of FIGS. 47-51, the housing seat 70 is made in advantageously circular hole form, within such at least one undercut element 61 and with such hole that is extended transverse to the extension of such undercut element 61 substantially parallel to the base support 56, preferably crossing through the thickness of such undercut element 61. Advantageously, two undercut elements 61 are provided also in this case and the housing seat 70 is obtained with a hole made centrally with respect to the two undercut elements 61, astride the same, and advantageously with a milling that only partially covers one face of each of such undercut elements 61.

In accordance with a non-illustrated embodiment of the hinge 100, the housing seat 70 is made in the thickness of the base support 56 orthogonal to the lower surface 58 starting from the upper surface 57 towards the lower surface 58 and in the form of a track open at the ends as well as on a front side defined by the same thickness of the base support 56.

In accordance with a further different non-illustrated embodiment of the hinge 100, the housing seat 70 is made in the thickness of the base support 56, parallel thereto, starting from a terminal edge (along the longitudinal extension direction of the hinge) of the lower surface 58 towards the shoulders 23 and is made in the form of a track open frontally as well as on the lower surface 58.

Advantageously, with reference to the examples of FIGS. 52-57, the articulation element 40, 50 is fixed to a core 59 intended to be embedded in the matrix of the temple 200. The housing seat 70 is made in the aforesaid enlarged plate 59' of the core 59 of the hinge 100, in particular above or laterally with respect to the enlarged plate 59' of the core 59 itself.

Figure 56:
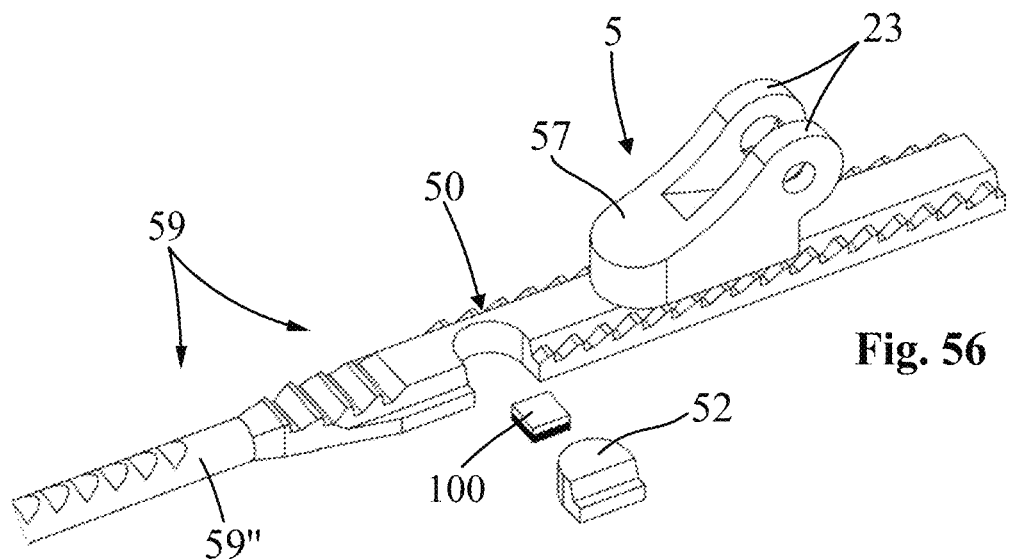
FIG. 56 shows a female articulation of a variant of the aforesaid fifth embodiment according to the present invention.

In particular, the embodiments of FIGS. 52-55 and 57 make reference to examples in which the core 59 carries, fixed thereto, the male articulation element 40 and FIG. 56 makes reference to an example in which the core 59 carries, fixed thereto, the female articulation element 50.

Figure 57:
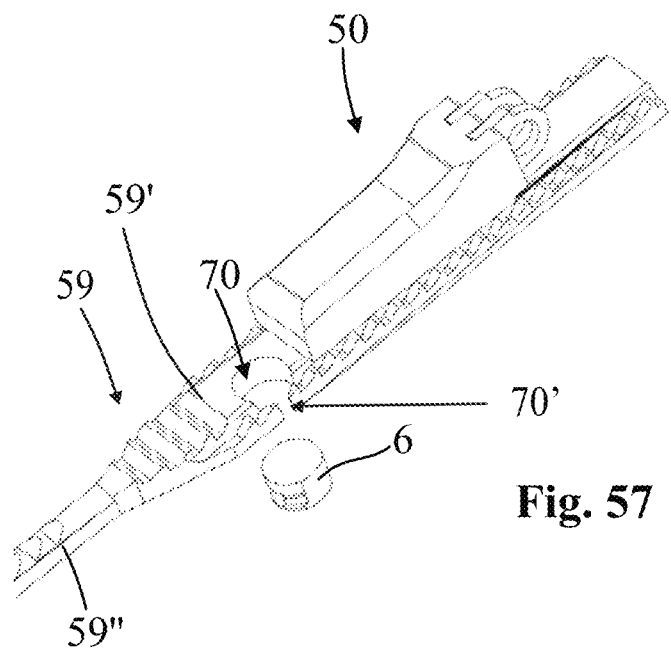
FIG. 57 shows a male articulation of a further variant of the aforesaid fifth embodiment according to the present invention.

In particular, in accordance with the example of FIG. 57 (of course also applicable to the examples of FIGS. 52-56), the housing seat 70 is provided with a slit 70' (preferably having width lower than that of the housing seat 70) which is extended up to the lateral edge of the enlarged plate 59' of the core 59.

The invention claimed is:

1. Hinge (100) for eyeglasses, which comprises:
   a first articulation element (40) intended to be mechanically connected to a first component of an eyeglass frame,
   a second articulation element (50) intended to be mechanically connected to a second component of the eyeglass frame, and rotatably coupled to said first articulation element (40) by means of a hinge pin (60);
   at least one housing seat (70) made in at least one shaped articulation element selected between said first articulation element (40) and said second articulation element (50);
   a TAG assembly (1) housed within said housing seat (70);
   wherein said TAG assembly (1) comprises:
   a TAG electronic identification device (2) provided with at least one support layer (3), with at least one antenna (4), and with at least one chip (5) mounted on said support layer (3) and connected to said antenna (4);
   a support body (6) which contains said TAG electronic identification device (2) at its interior and is inserted in said housing seat (70);
   wherein said support body (6) is provided with:
   a seat (7), which is made in said support body (6), removably houses said TAG electronic identification device (2), and is provided with an opening (8) for the insertion of said TAG electronic identification device (2) in said seat (7);
   at least one elastically pliable portion (9), which at least partially defines said seat (7) and intercepts said TAG electronic identification device (2) in order to retain said TAG electronic identification device (2) within said seat (7).

2. Hinge according to claim 1, wherein said at least one elastically pliable portion (9) comprises at least one tab, which is integrally made with a remaining part of the support body (6), projects into said opening (8), partially limiting said opening (8) in a manner such that said at least one tab is susceptible of interfering with said TAG electronic identification device (2) during the insertion of said TAG electronic identification device (2) in said seat (7).

3. Hinge according to claim 2, wherein said at least one tab is provided with a protruding nosepiece (90), which is made on an internal face of said support body (6) directed towards the interior of said seat (7), and retains said TAG electronic identification device (2) within said seat (7).

4. Hinge according to claim 1, wherein said at least one elastically pliable portion (9) is a protruding nosepiece (90), which projects from at least one lateral wall (10) of said seat (7) and retains via interference said TAG electronic identification device (2) in said seat (7).

5. Hinge according to claim 1, wherein said at least one elastically pliable portion (9) is a protruding nosepiece (90), which projects from at least one bottom wall (11) of said seat (7), and retains via interference said TAG electronic identification device (2) in said seat (7).

6. Hinge according to claim 1, wherein said at least one elastically pliable portion (9) is at least one convex portion (9') of at least one lateral wall (10) and/or of at least one bottom wall (11) of said seat (7);
   wherein said TAG electronic identification device (2) is retained in said seat (7) via interference with said convex portion (9').

7. Hinge according to claim 1, wherein said support body (6) is substantially cylindrical and said seat (7) is made transverse to a height axis (Y) of said cylindrical support body (6).

8. Hinge according to claim 1, wherein said support body (6) is substantially cylindrical and said seat (7) is made along a height axis (Y) of said cylindrical support body (6) starting from an end face (13) of said cylindrical support body (6);
   wherein said at least one elastically pliable portion (9) is at least one convex portion (9") of at least one lateral wall (10') of said seat (7);
   wherein said TAG electronic identification device (2) is retained in said seat (7) via interference with the convex portion (9") of said lateral wall (10').

9. Hinge according to claim 1, wherein said support body (6) does not comprise any TAG electronic reader.

10. Hinge according to claim 1, wherein said support body (6) does not comprise any electrical or electronic component.

11. Hinge according to claim 1, wherein said support body (6) is made of a single body.

12. Hinge according to claim 1, wherein said support body (6) is made entirely of electrically insulating material.

13. Hinge according to claim 1, wherein said support body (6) is made of plastic material.

14. Hinge according to claim 1, wherein said support body (6) has width and/or length and/or height substantially comprised between 1 and 4 millimeters.

15. Hinge according to claim 1, wherein said TAG electronic identification device (2) is entirely inserted within the seat (7) of said support body (6).

16. Hinge according to claim 1, wherein said articulation element is provided with a base support (56) from which one or more shoulders (23) are projectingly extended, and with an opposite lower surface (58) intended to be fixed to said frame; wherein said first housing seat (70) is made in said base support (56).

17. Hinge according to claim 16, wherein from the lower surface (58) of said base support (56), at least one undercut element (61) is extended that is intended to be engaged within a plastic matrix of said frame; wherein said housing seat (70) is at least partially made in said at least one undercut element (61).

18. Hinge for eyeglasses according to claim 17, wherein from the lower surface (58) of said base support (56), two said undercut elements (61) are extended; wherein said housing seat (70) is at least partially made astride the two said undercut elements (61).

19. Hinge for eyeglasses according to claim 1, comprising a core (59) which is intended to be embedded in a plastic matrix of a temple of the frame of said eyeglasses and is provided with an enlarged plate (59') on which said articulation element is fixed; wherein said first housing seat (70) is made in the enlarged plate (59') of said core (59).

20. Hinge according to claim 19, wherein said housing seat (70) is made on the upper part or laterally with respect to the enlarged plate (59') of said core (59).

* * * * *